United States Patent
Venkataraman et al.

(10) Patent No.: US 9,456,134 B2
(45) Date of Patent: *Sep. 27, 2016

(54) ARRAY CAMERA CONFIGURATIONS INCORPORATING CONSTITUENT ARRAY CAMERAS AND CONSTITUENT CAMERAS

(71) Applicant: Pelican Imaging Corporation, Santa Clara, CA (US)

(72) Inventors: Kartik Venkataraman, San Jose, CA (US); Jacques Duparré, Jena (DE)

(73) Assignee: Pelican Imaging Corporation, Santa Clara, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/555,368

(22) Filed: Nov. 26, 2014

(65) Prior Publication Data

US 2015/0146030 A1 May 28, 2015

Related U.S. Application Data

(63) Continuation of application No. 14/555,279, filed on Nov. 26, 2014.

(60) Provisional application No. 61/909,308, filed on Nov. 26, 2013.

(51) Int. Cl.
*H04N 5/232* (2006.01)
*H04N 13/02* (2006.01)
(Continued)

(52) U.S. Cl.
CPC ......... *H04N 5/23232* (2013.01); *G06T 3/4053* (2013.01); *G06T 7/0065* (2013.01); *H04N 5/2258* (2013.01); *H04N 5/23296* (2013.01);
(Continued)

(58) Field of Classification Search
CPC ........... H04N 5/2258; H04N 5/23229; H04N 5/23232; H04N 5/23296; G06T 3/4053
See application file for complete search history.

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| EP | 840502 A2 | 5/1998 |
| EP | 2336816 A2 | 6/2011 |

(Continued)

OTHER PUBLICATIONS

Kitamura et al., "Reconstruction of a high-resolution image on a compound-eye image-capturing system", Applied Optics, Mar. 10, 2004, vol. 43, No. 8, pp. 1719-1727.

(Continued)

*Primary Examiner* — Daniel M Pasiewicz
(74) *Attorney, Agent, or Firm* — KPPB LLP

(57) ABSTRACT

Systems and methods for implementing array camera configurations that include a plurality of constituent array cameras, where each constituent array camera provides a distinct field of view and/or a distinct viewing direction, are described. In several embodiments, image data captured by the constituent array cameras is used to synthesize multiple images that are subsequently blended. In a number of embodiments, the blended images include a foveated region. In certain embodiments, the blended images possess a wider field of view than the fields of view of the multiple images.

23 Claims, 9 Drawing Sheets

(51) Int. Cl.
  *H04N 17/00* (2006.01)
  *H04N 5/369* (2011.01)
  *H04N 5/225* (2006.01)
  *H04N 5/265* (2006.01)
  *G06T 3/40* (2006.01)
  *G06T 7/00* (2006.01)

(52) U.S. Cl.
  CPC ............ *H04N 5/265* (2013.01); *H04N 5/3696* (2013.01); *H04N 13/02* (2013.01); *H04N 17/002* (2013.01); *G06T 2207/10052* (2013.01)

(56) References Cited

U.S. PATENT DOCUMENTS

| | | | |
|---|---|---|---|
| 4,323,925 | A | 4/1982 | Abell et al. |
| 4,460,449 | A | 7/1984 | Montalbano |
| 4,467,365 | A | 8/1984 | Murayama et al. |
| 5,005,083 | A | 4/1991 | Grage |
| 5,070,414 | A | 12/1991 | Tsutsumi |
| 5,144,448 | A | 9/1992 | Hornbaker |
| 5,327,125 | A | 7/1994 | Iwase et al. |
| 5,629,524 | A | 5/1997 | Stettner et al. |
| 5,808,350 | A | 9/1998 | Jack et al. |
| 5,832,312 | A | 11/1998 | Rieger et al. |
| 5,880,691 | A | 3/1999 | Fossum et al. |
| 5,933,190 | A | 8/1999 | Dierickx et al. |
| 5,973,844 | A | 10/1999 | Burger |
| 6,002,743 | A | 12/1999 | Telymonde |
| 6,034,690 | A | 3/2000 | Gallery et al. |
| 6,069,351 | A | 5/2000 | Mack |
| 6,069,365 | A | 5/2000 | Chow et al. |
| 6,097,394 | A | 8/2000 | Levoy et al. |
| 6,124,974 | A | 9/2000 | Burger |
| 6,137,535 | A | 10/2000 | Meyers |
| 6,141,048 | A | 10/2000 | Meyers |
| 6,160,909 | A | 12/2000 | Melen |
| 6,205,241 | B1 | 3/2001 | Melen |
| 6,358,862 | B1 | 3/2002 | Ireland et al. |
| 6,477,260 | B1 | 11/2002 | Shimomura |
| 6,603,513 | B1 | 8/2003 | Berezin |
| 6,611,289 | B1 | 8/2003 | Yu |
| 6,627,896 | B1 | 9/2003 | Hashimoto et al. |
| 6,635,941 | B2 | 10/2003 | Suda |
| 6,657,218 | B2 | 12/2003 | Noda |
| 6,671,399 | B1 | 12/2003 | Berestov |
| 6,750,904 | B1 | 6/2004 | Lambert |
| 6,765,617 | B1 | 7/2004 | Tangen et al. |
| 6,771,833 | B1 | 8/2004 | Edgar |
| 6,774,941 | B1 | 8/2004 | Boisvert et al. |
| 6,795,253 | B2 | 9/2004 | Shinohara |
| 6,819,358 | B1 | 11/2004 | Kagle et al. |
| 6,879,735 | B1 | 4/2005 | Portniaguine et al. |
| 6,903,770 | B1 | 6/2005 | Kobayashi et al. |
| 6,909,121 | B2 | 6/2005 | Nishikawa |
| 6,958,862 | B1 | 10/2005 | Joseph |
| 7,085,409 | B2 | 8/2006 | Sawhney et al. |
| 7,199,348 | B2 | 4/2007 | Olsen et al. |
| 7,262,799 | B2 | 8/2007 | Suda |
| 7,292,735 | B2 | 11/2007 | Blake et al. |
| 7,295,697 | B1 | 11/2007 | Satoh |
| 7,369,165 | B2 | 5/2008 | Bosco et al. |
| 7,391,572 | B2 | 6/2008 | Jacobowitz et al. |
| 7,408,725 | B2 | 8/2008 | Sato |
| 7,606,484 | B1 | 10/2009 | Richards et al. |
| 7,633,511 | B2 | 12/2009 | Shum et al. |
| 7,657,090 | B2 | 2/2010 | Omatsu et al. |
| 7,675,080 | B2 | 3/2010 | Boettiger |
| 7,675,681 | B2 | 3/2010 | Tomikawa et al. |
| 7,706,634 | B2 | 4/2010 | Schmitt et al. |
| 7,723,662 | B2 | 5/2010 | Levoy et al. |
| 7,782,364 | B2 | 8/2010 | Smith |
| 7,840,067 | B2 | 11/2010 | Shen et al. |
| 7,912,673 | B2 | 3/2011 | Hébert et al. |
| 7,973,834 | B2 | 7/2011 | Yang |
| 7,986,018 | B2 | 7/2011 | Rennie |
| 7,990,447 | B2 | 8/2011 | Honda et al. |
| 8,000,498 | B2 | 8/2011 | Shih et al. |
| 8,013,904 | B2 | 9/2011 | Tan et al. |
| 8,027,531 | B2 | 9/2011 | Wilburn et al. |
| 8,044,994 | B2 | 10/2011 | Vetro et al. |
| 8,077,245 | B2 | 12/2011 | Adamo et al. |
| 8,106,949 | B2 | 1/2012 | Tan et al. |
| 8,126,279 | B2 | 2/2012 | Marcellin et al. |
| 8,131,097 | B2 | 3/2012 | Lelescu et al. |
| 8,164,629 | B1 | 4/2012 | Zhang |
| 8,180,145 | B2 | 5/2012 | Wu et al. |
| 8,189,089 | B1 | 5/2012 | Georgiev |
| 8,213,711 | B2 | 7/2012 | Tam |
| 8,231,814 | B2 | 7/2012 | Duparre |
| 8,242,426 | B2 | 8/2012 | Ward et al. |
| 8,244,027 | B2 | 8/2012 | Takahashi |
| 8,254,668 | B2 | 8/2012 | Mashitani et al. |
| 8,279,325 | B2 | 10/2012 | Pitts et al. |
| 8,294,099 | B2 | 10/2012 | Blackwell, Jr. |
| 8,305,456 | B1 | 11/2012 | McMahon |
| 8,315,476 | B1 | 11/2012 | Georgiev et al. |
| 8,345,144 | B1 | 1/2013 | Georgiev et al. |
| 8,360,574 | B2 | 1/2013 | Ishak et al. |
| 8,406,562 | B2 | 3/2013 | Bassi et al. |
| 8,446,492 | B2 | 5/2013 | Nakano et al. |
| 8,514,491 | B2 | 8/2013 | Duparre |
| 8,541,730 | B2 | 9/2013 | Inuiya |
| 8,542,933 | B2 | 9/2013 | Venkataraman et al. |
| 8,619,082 | B1 | 12/2013 | Ciurea et al. |
| 8,655,052 | B2 | 2/2014 | Spooner et al. |
| 8,692,893 | B2 | 4/2014 | McMahon |
| 8,773,536 | B1 | 7/2014 | Zhang |
| 8,780,113 | B1 | 7/2014 | Ciurea et al. |
| 8,804,255 | B2 | 8/2014 | Duparre |
| 8,831,367 | B2 | 9/2014 | Venkataraman et al. |
| 8,854,462 | B2 | 10/2014 | Herbin et al. |
| 8,861,089 | B2 | 10/2014 | Duparre |
| 8,866,912 | B2 | 10/2014 | Mullis |
| 8,866,920 | B2 | 10/2014 | Venkataraman et al. |
| 8,878,950 | B2 | 11/2014 | Lelescu et al. |
| 8,885,059 | B1 | 11/2014 | Venkataraman et al. |
| 8,885,922 | B2 | 11/2014 | Kobayashi et al. |
| 8,896,719 | B1 | 11/2014 | Venkataraman et al. |
| 8,902,321 | B2 | 12/2014 | Venkataraman et al. |
| 2001/0005225 | A1 | 6/2001 | Clark et al. |
| 2001/0019621 | A1 | 9/2001 | Hanna et al. |
| 2001/0038387 | A1 | 11/2001 | Tomooka et al. |
| 2002/0012056 | A1 | 1/2002 | Trevino |
| 2002/0027608 | A1 | 3/2002 | Johnson |
| 2002/0039438 | A1 | 4/2002 | Mori et al. |
| 2002/0063807 | A1 | 5/2002 | Margulis |
| 2002/0087403 | A1 | 7/2002 | Meyers et al. |
| 2002/0089596 | A1 | 7/2002 | Suda |
| 2002/0094027 | A1 | 7/2002 | Sato et al. |
| 2002/0101528 | A1 | 8/2002 | Lee |
| 2002/0113867 | A1 | 8/2002 | Takigawa et al. |
| 2002/0113888 | A1 | 8/2002 | Sonoda et al. |
| 2002/0122113 | A1 | 9/2002 | Foote et al. |
| 2002/0163054 | A1 | 11/2002 | Suda et al. |
| 2002/0167537 | A1 | 11/2002 | Trajkovic |
| 2002/0177054 | A1 | 11/2002 | Saitoh et al. |
| 2003/0086079 | A1 | 5/2003 | Barth et al. |
| 2003/0124763 | A1 | 7/2003 | Fan et al. |
| 2003/0140347 | A1 | 7/2003 | Varsa |
| 2003/0179418 | A1 | 9/2003 | Wengender et al. |
| 2003/0190072 | A1 | 10/2003 | Adkins et al. |
| 2003/0198377 | A1 | 10/2003 | Ng et al. |
| 2003/0211405 | A1 | 11/2003 | Venkataraman |
| 2004/0008271 | A1 | 1/2004 | Hagimori et al. |
| 2004/0012689 | A1 | 1/2004 | Tinnerino |
| 2004/0027358 | A1 | 2/2004 | Nakao |
| 2004/0047274 | A1 | 3/2004 | Amanai |
| 2004/0050104 | A1 | 3/2004 | Ghosh et al. |
| 2004/0056966 | A1 | 3/2004 | Schechner et al. |
| 2004/0061787 | A1 | 4/2004 | Liu et al. |
| 2004/0066454 | A1 | 4/2004 | Otani et al. |
| 2004/0100570 | A1 | 5/2004 | Shizukuishi |
| 2004/0114807 | A1 | 6/2004 | Lelescu et al. |
| 2004/0151401 | A1 | 8/2004 | Sawhney et al. |

(56) References Cited

U.S. PATENT DOCUMENTS

| | | |
|---|---|---|
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0012035 A1 | 1/2005 | Miller |
| 2005/0036778 A1 | 2/2005 | DeMonte |
| 2005/0048690 A1 | 3/2005 | Yamamoto |
| 2005/0068436 A1 | 3/2005 | Fraenkel et al. |
| 2005/0128509 A1* | 6/2005 | Tokkonen ............... H04N 9/045 358/1.15 |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0033005 A1 | 2/2006 | Jerdev et al. |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0159369 A1 | 7/2006 | Young |
| 2006/0176566 A1 | 8/2006 | Boettiger et al. |
| 2006/0187338 A1 | 8/2006 | May et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0040828 A1 | 2/2007 | Zalevsky et al. |
| 2007/0040922 A1 | 2/2007 | McKee et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1* | 4/2007 | Bazakos ............ G06K 9/00255 396/427 |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146503 A1* | 6/2007 | Shiraki ................ H04N 3/1593 348/231.3 |
| 2007/0146511 A1 | 6/2007 | Kinoshita et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1* | 11/2007 | Baek .................. G02B 26/0825 348/340 |
| 2007/0263114 A1 | 11/2007 | Gurevich et al. |
| 2007/0268374 A1 | 11/2007 | Robinson |
| 2007/0296835 A1 | 12/2007 | Olsen |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0174670 A1* | 7/2008 | Olsen ................ H01L 27/14645 348/222.1 |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0102956 A1 | 4/2009 | Georgiev |
| 2009/0109306 A1 | 4/2009 | Shan et al. |
| 2009/0128833 A1 | 5/2009 | Yahav |
| 2009/0129667 A1 | 5/2009 | Ho |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0268192 A1 | 10/2009 | Koenck et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0053342 A1 | 3/2010 | Hwang |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0086227 A1 | 4/2010 | Sun et al. |
| 2010/0091389 A1 | 4/2010 | Henriksen et al. |

(56) References Cited

U.S. PATENT DOCUMENTS

| | | |
|---|---|---|
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0133230 A1 | 6/2010 | Henriksen et al. |
| 2010/0141802 A1 | 6/2010 | Knight et al. |
| 2010/0142839 A1 | 6/2010 | Lakus-becker |
| 2010/0157073 A1 | 6/2010 | Kondo et al. |
| 2010/0165152 A1 | 7/2010 | Lim |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0259610 A1 | 10/2010 | Petersen et al. |
| 2010/0265346 A1* | 10/2010 | Iizuka .................. H04N 13/025 348/218.1 |
| 2010/0265385 A1 | 10/2010 | Knight |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2011/0001037 A1 | 1/2011 | Tewinkle |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic |
| 2011/0255592 A1 | 10/2011 | Sung et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | Mcmahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0026366 A1* | 2/2012 | Golan .................. H04N 5/232 348/240.2 |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0056982 A1 | 3/2012 | Katz et al. |
| 2012/0062702 A1 | 3/2012 | Jiang et al. |
| 2012/0069235 A1 | 3/2012 | Imai |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0154551 A1 | 6/2012 | Inoue |
| 2012/0163672 A1 | 6/2012 | McKinnon et al. |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0198677 A1 | 8/2012 | Duparre |
| 2012/0200734 A1 | 8/2012 | Tang |
| 2012/0229628 A1 | 9/2012 | Ishiyama et al. |
| 2012/0249550 A1 | 10/2012 | Akeley et al. |
| 2012/0249750 A1* | 10/2012 | Izzat .................. G06T 7/0022 348/47 |
| 2012/0262607 A1 | 10/2012 | Shimura et al. |
| 2012/0287291 A1 | 11/2012 | McMahon et al. |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0093842 A1* | 4/2013 | Yahata .................. H04N 5/23238 348/38 |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0229540 A1 | 9/2013 | Farina et al. |
| 2013/0250150 A1* | 9/2013 | Malone .................. G02B 15/00 348/262 |
| 2013/0259317 A1 | 10/2013 | Gaddy |
| 2013/0265459 A1 | 10/2013 | Duparre et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0076336 A1 | 3/2014 | Clayton et al. |
| 2014/0078333 A1* | 3/2014 | Miao .................. H04N 5/23212 348/222.1 |
| 2014/0079336 A1 | 3/2014 | Venkataraman et al. |
| 2014/0092281 A1 | 4/2014 | Nisenzon et al. |
| 2014/0118584 A1* | 5/2014 | Lee .................. H04N 5/2254 348/262 |
| 2014/0132810 A1 | 5/2014 | McMahon |
| 2014/0176592 A1 | 6/2014 | Wilburn et al. |
| 2014/0198188 A1 | 7/2014 | Izawa |
| 2014/0218546 A1 | 8/2014 | Mcmahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |

(56) References Cited

U.S. PATENT DOCUMENTS

| | | | |
|---|---|---|---|
| 2014/0354843 A1 | 12/2014 | Venkataraman et al. | |
| 2014/0354844 A1 | 12/2014 | Venkataraman et al. | |
| 2014/0354853 A1 | 12/2014 | Venkataraman et al. | |
| 2014/0354854 A1 | 12/2014 | Venkataraman et al. | |
| 2014/0354855 A1 | 12/2014 | Venkataraman et al. | |
| 2014/0355870 A1 | 12/2014 | Venkataraman et al. | |
| 2015/0002734 A1* | 1/2015 | Lee | H04N 5/2256 348/367 |
| 2015/0085174 A1* | 3/2015 | Shabtay | H04N 5/23296 348/336 |
| 2015/0146029 A1* | 5/2015 | Venkataraman | H04N 5/23232 348/218.1 |
| 2015/0146030 A1 | 5/2015 | Venkataraman et al. | |

FOREIGN PATENT DOCUMENTS

| | | |
|---|---|---|
| JP | 2006033493 A | 2/2006 |
| JP | 2007520107 A | 7/2007 |
| JP | 2011109484 A | 6/2011 |
| JP | 2013526801 A | 6/2013 |
| JP | 2014521117 A | 8/2014 |
| WO | 2007083579 A1 | 7/2007 |
| WO | 2008108271 A1 | 9/2008 |
| WO | 2009151903 A2 | 12/2009 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2015081279 A1 | 6/2015 |

OTHER PUBLICATIONS

Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lensvector, "How LensVector Autofocus Works", printed Nov. 2, 2012 from http://www.lensvector.com/overview.html, 1 pg.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://vvww.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pp. 115-129.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.

(56) References Cited

OTHER PUBLICATIONS

Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (Sep.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://vvww.astro.umd.edu/~veilleux/ASTR310/fall06/ccd_theory.pdf, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Extended European Search Report for European Application EP12782935.6, report completed Aug. 28, 2014 Mailed Sep. 4, 2014, 6 Pgs.
International Preliminary Report on Patentability for International Application No. PCT/US2012/059813, Completed Apr. 15, 2014, 7 pgs.
International Preliminary Report on Patentability for International Application PCT/US2013/024987, Mailed Aug. 21, 2014, 13 Pgs.
International Preliminary Report on Patentability for International Application PCT/US2013/027146, completed Aug. 26, 2014, Mailed Sep. 4, 2014, 10 Pages.
International Preliminary Report on Patentability for International Application PCT/US2013/039155, completed Nov. 4, 2014, Mailed Nov. 13, 2014, 10 Pgs.
International Preliminary Report on Patentability for International Application PCT/US2014/030692, issued Sep. 15, 2015, Mailed Sep. 24, 2015, 6Pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, 12 pgs.
International Search Report and Written Opinion for International Application No.PCT/US2013/048772, Completed Oct. 21, 2013, Mailed Nov. 8, 2013, 11 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 12 pgs.
International Search Report and Written Opinion for International Application PCT/US11/36349, mailed Aug. 22, 2011, 11 pgs.
International Search Report and Written Opinion for International Application PCT/US13/62720, completed Mar. 25, 2014, Mailed Apr. 21, 2014, 9 Pgs.
International Search Report and Written Opinion for International Application PCT/US14/024903 completed Jun. 12, 2014, Mailed, Jun. 27, 2014, 13 pgs.
International Search Report and Written Opinion for International Application PCT/US14/17766, completed May 28, 2014, Mailed Jun. 18, 2014, 9 Pgs.
International Search Report and Written Opinion for International Application PCT/US14/18084, completed May 23, 2014, Mailed Jun. 10, 2014, 12 pgs.
International Search Report and Written Opinion for International Application PCT/US14/18116, Report completed May 13, 2014, 12 pgs.
International Search Report and Written Opinion for International Application PCT/US14/22118, report completed Jun. 9, 2014, Mailed, Jun. 25, 2014, 5 pgs.
International Search Report and Written Opinion for International Application PCT/US14/22774 report completed Jun. 9, 2014, Mailed Jul. 14, 2014, 6 Pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014 5 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.

(56) References Cited

OTHER PUBLICATIONS

International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, Report completed Dec. 17, 2012, 8 pgs.
International Search Report and Written Opinion for International Application PCT/US2012/37670, Mailed Jul. 18, 2012, Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/22123, report completed Jun. 9, 2014, Mailed Jun. 25, 2014, 5 pgs.
International Search Report and Written Opinion for International Application PCT/US2014/024947, Report Completed Jul. 8, 2014, Mailed Aug. 5, 2014, 8 Pgs.
International Search Report and Written Opinion for International Application PCT/US2014/028447, completed Jun. 30, 2014, Mailed Jul. 21, 2014, 8 Pgs.
International Search Report and Written Opinion for International Application PCT/US2014/030692, completed Jul. 28, 2014, Mailed Aug. 27, 2014, 7 Pages.
International Search Report and Written Opinion for International Application PCT/US2014/067740, Completed Jan. 29, 2015, Mailed Mar. 3, 2015, 10 pgs.
International Search Report and Written Opinion for International Application PCT/US2014/23762, Completed May 30, 2014, Mailed Jul. 3, 2014, 6 Pgs.
Office Action for U.S. Appl. No. 12/952106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic.Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al.,"Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download-?doi=1 0.1.1.226.2643&rep=rep1 &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303- 4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.

(56) References Cited

OTHER PUBLICATIONS

Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 10, 2012). Retrieved from the Internet at URL:<http://vvww.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al. "Optical System Design", 2nd Edition, SPIE Press, pp. 191-198.
Fischer et al. "Optical System Design", 2nd Edition, SPIE Press, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, Apr. 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi, et al. "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. I-103-I-110.
International Preliminary Report on Patentability for International Application PCT/US2014/067740, issued May 31, 2016, Mailed Jun. 9, 2016, 9 Pgs.

\* cited by examiner

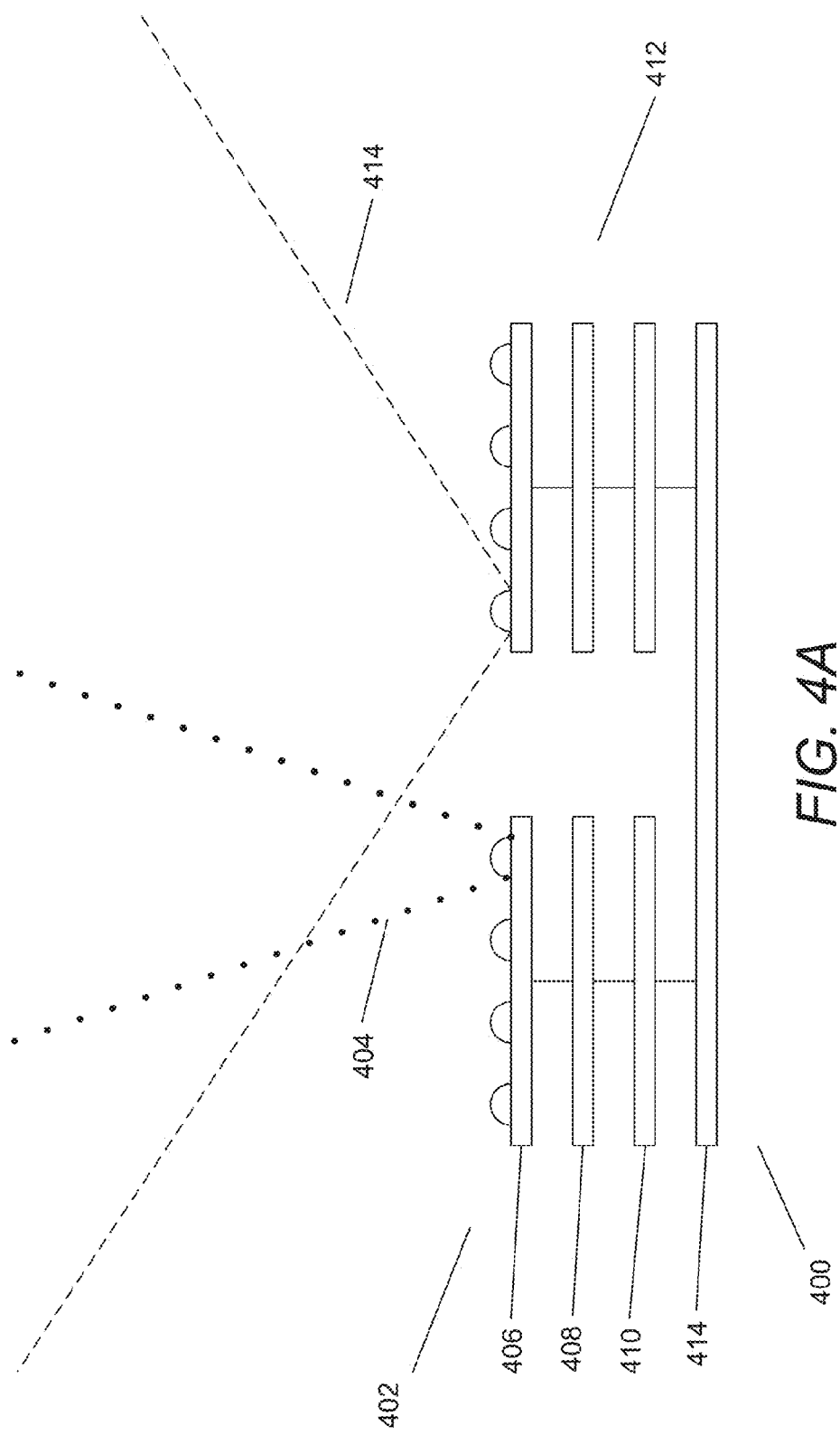

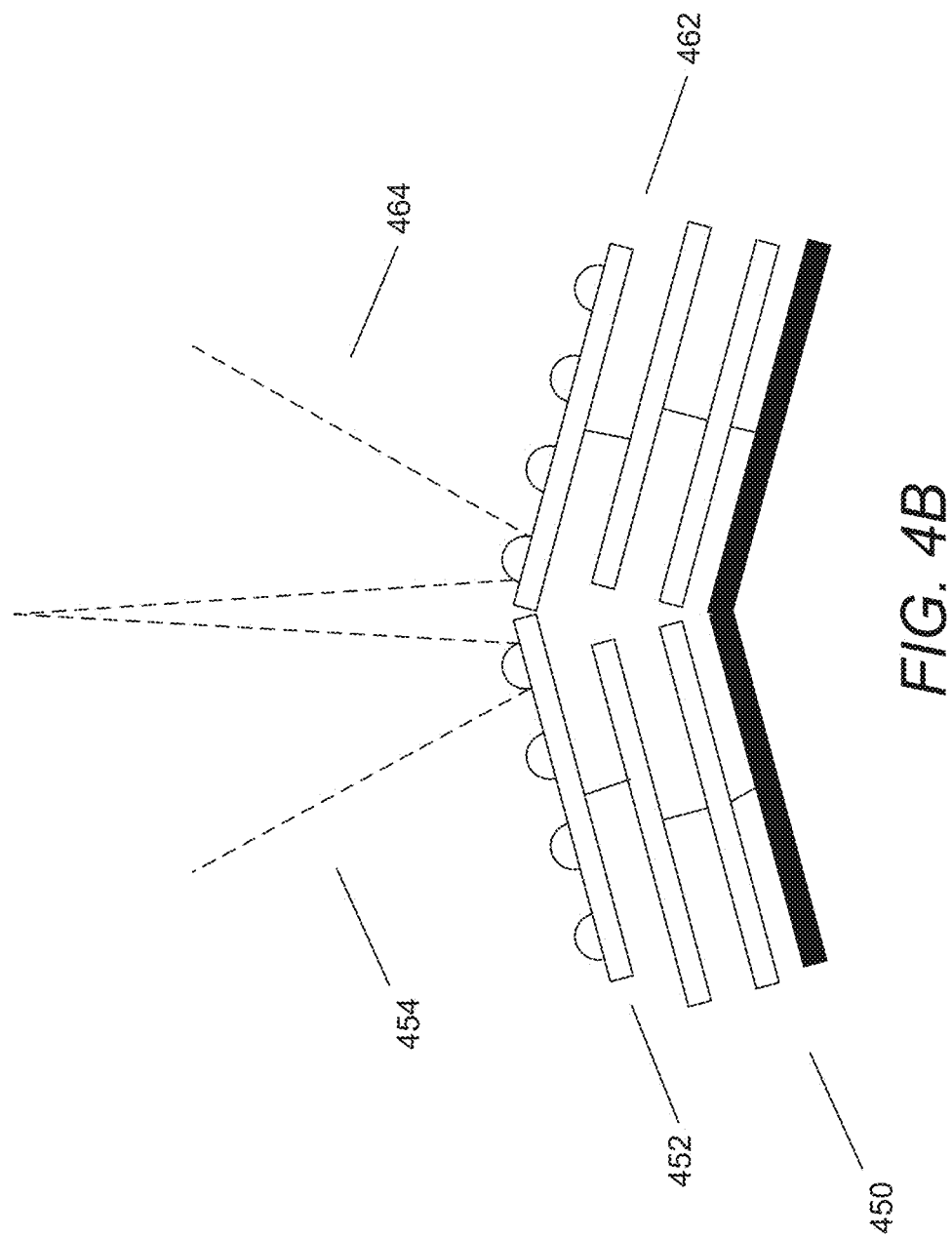

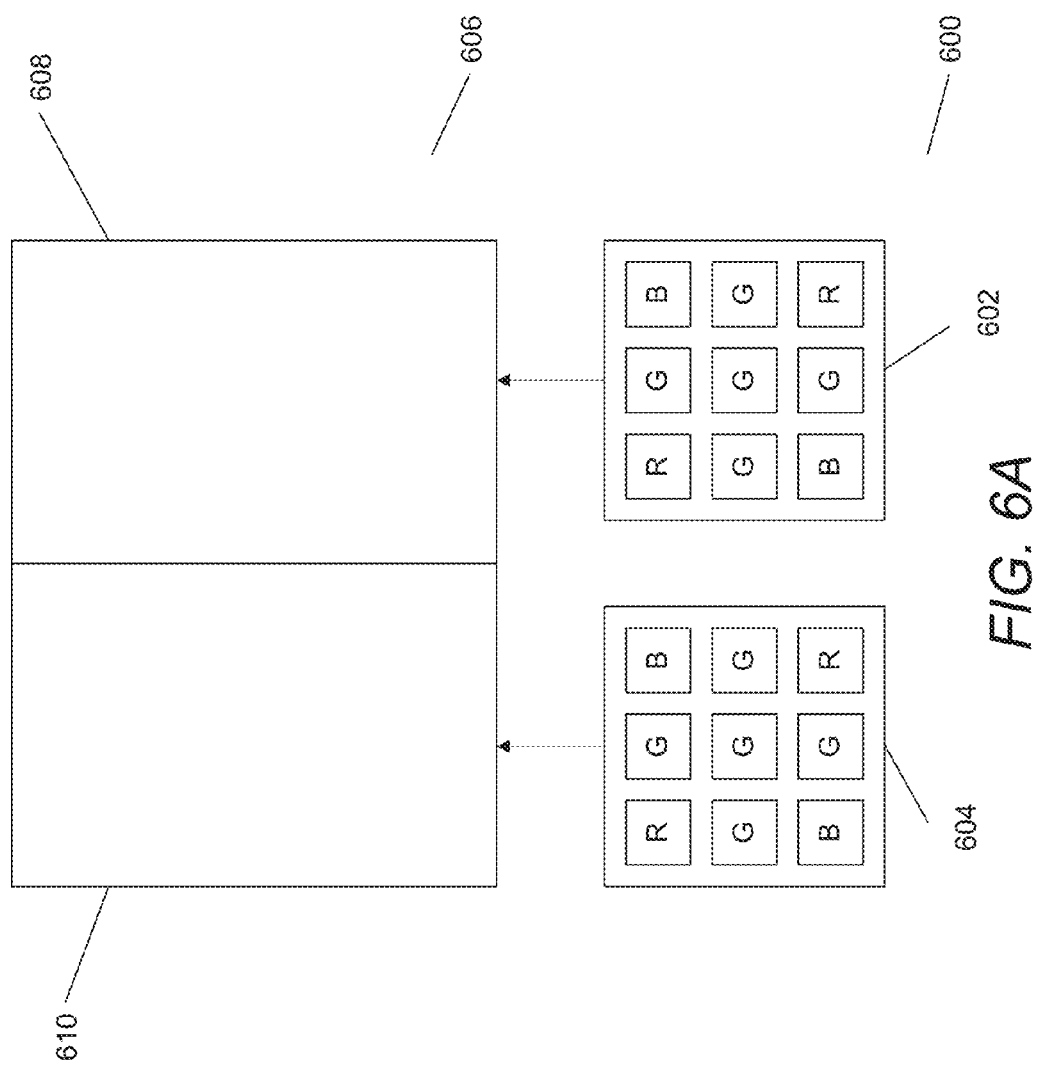

ARRAY CAMERA CONFIGURATIONS INCORPORATING CONSTITUENT ARRAY CAMERAS AND CONSTITUENT CAMERAS

CROSS-REFERENCE TO RELATED APPLICATIONS

The current application is a continuation of U.S. Non-Provisional patent application Ser. No. 14/555,279, entitled "Array Camera Configurations Incorporating Multiple Constituent Array Cameras" to Venkataraman et al., filed Nov. 26, 2014, which application claims priority under 35 U.S.C. §119(e) to U.S. Provisional Patent Application Ser. No. 61/909,308 entitled "Stereo Array Configuration for a Zoom Camera" to Venkataraman et al., filed Nov. 26, 2013. The disclosures of application Ser. Nos. 14/555,279 and 61/909,308 are incorporated by reference herein in their entirety.

FIELD OF THE INVENTION

The present invention generally relates to array cameras and more specifically to array camera configurations that include one or more constituent array cameras and/or one or more constituent cameras.

BACKGROUND OF THE INVENTION

Conventional digital cameras based upon the camera obscura typically include a single focal plane with a lens stack. The focal plane includes an array of light sensitive pixels and is part of a sensor. The lens stack creates an optical channel that forms an image of a scene upon the array of light sensitive pixels in the focal plane. Each light sensitive pixel can generate image data based upon the light incident upon the pixel.

In response to the constraints placed upon a conventional digital camera, a new class of cameras that can be referred to as array cameras has been proposed. Array cameras are characterized in that they include an imager array that has multiple arrays of pixels, where each pixel array is intended to define a focal plane, and each focal plane has a separate lens stack. Typically, each focal plane includes a plurality of rows of pixels that also forms a plurality of columns of pixels, and each focal plane is contained within a region of the imager array that does not contain pixels from another focal plane. An image is typically formed on each focal plane by its respective lens stack. In many instances, the array camera is constructed using an imager array that incorporates multiple focal planes and an optic array of lens stacks.

SUMMARY OF THE INVENTION

Systems and methods in accordance with embodiments of the invention implement array camera configurations that include a plurality of constituent array cameras, where each constituent array camera has a distinct field of view and/or a distinct viewing direction. One embodiment of the invention includes: at least two constituent array cameras; a processor; and memory containing an image processing application and calibrated warp data. In addition, each constituent array camera includes a plurality of cameras, where each camera comprises optics that form an image on a focal plane defined by an array of pixels that capture image data and have fields of view that form a combined field of view for the constituent array camera. Furthermore, each of the at least two constituent array cameras differ with respect to at least one of combined field of view and viewing direction. The image processing application directs the processor to: for each of the at least two constituent array cameras: obtain image data from the cameras in the constituent array camera; generate a depth map using the image data captured by the cameras in the constituent array camera; and synthesize an image using the image data captured by the cameras in the constituent array camera and the depth map; construct an enhanced image using the image data obtained from the cameras in the at least two constituent array cameras by: warping at least a first of the synthesized images into a viewpoint of a second of the synthesized images using a depth map for the first of the synthesized images and calibrated warp data; and blending the at least a first of the synthesized images warped into the viewpoint of the second of the synthesized images and the second of the synthesized images to create the enhanced image.

In a further embodiment, the plurality of cameras in a first constituent array camera have fields of view that are narrower than and within the fields of view of the plurality of cameras in a second constituent array camera.

In another embodiment, the plurality of cameras in the first constituent array camera capture image data at a higher angular resolution than the image data captured by the plurality of cameras in the second constituent array camera.

In a still further embodiment, the plurality of cameras in the first constituent array camera have optics with larger magnification than the optics of the cameras in the second constituent array camera.

In still another embodiment, the plurality of cameras in the first constituent array camera include telephoto lenses; the plurality of cameras in the second constituent array camera include wide angle lenses; and the telephoto lenses have higher angular resolution and contrast and longer focal lengths than the wide angle lenses.

In a yet further embodiment, the optics of the cameras in the first constituent array camera include at least one adaptive optical element enabling the independent adjustment of the focal length of the camera.

In yet another embodiment, the optics of the cameras in the first constituent array camera include at least one adaptive optical element that can enable the lateral shifting of the centration of the refractive power distribution of the at least one adaptive optical element.

In a further embodiment again, the enhanced image has a field of view of the image synthesized using the image data captured by the second constituent array camera and includes a foveated high resolution region with an angular resolution of the image synthesized from the image data captured by the first constituent array camera.

In another embodiment again, the image processing application directs the processor to synthesize an image using the image data captured by the cameras in the constituent array camera and a depth map by performing a super-resolution process to synthesize a high resolution image using image data captured by the cameras in the constituent array camera and the depth map generated using the image data.

In a further additional embodiment, a first constituent array camera has a first viewing direction and a first combined field of view; and a second constituent array camera has a second viewing direction and a second combined field of view, where the first and second combined fields of view are partially overlapping beyond a specific object distance.

In another additional embodiment, the image processing application further directs the processor to generate a depth map for the enhanced image using the depth maps generated using the image data captured by each of the first constituent array camera and the second constituent array camera.

In a still further embodiment again, cameras in a constituent array camera have different imaging characteristics.

In still another embodiment again, at least one of the plurality of constituent array cameras includes a M×N array of cameras.

In a still further additional embodiment, at least one of the plurality of constituent arrays comprises an array camera module including an array of lens stacks forming separate apertures and an imager array including an array of focal planes, where each lens stack forms an image on a corresponding focal plane.

In still another additional embodiment, different cameras in at least one of the plurality of constituent array cameras capture images of different portions of the light spectrum.

In a yet further embodiment again, the lens stacks of the different cameras differ based upon the portion of the spectrum imaged by the camera.

In yet another embodiment again, at least one lens element in the lens stacks of the different cameras have a surface with different shapes.

In a further additional embodiment again, at least one lens element in the lens stacks of the different cameras are constructed from different materials.

In another additional embodiment again, different types of cameras in a constituent array camera are located on either side of a reference camera.

A still yet further embodiment again includes: at least two constituent array cameras including a first constituent array camera comprising a plurality of cameras, where each camera incorporates optics that form an image on a focal plane defined by an array of pixels that capture image data and have fields of view that form a first combined field of view in a first viewing direction; and a second constituent array camera comprising a plurality of cameras, where each camera incorporates optics that form an image on a focal plane defined by an array of pixels that capture image data; and have fields of view that form a second combined field of view in a second viewing direction. In addition, the plurality of cameras in the first constituent array camera have fields of view that are narrower than and within the fields of view of the plurality of cameras in the second constituent array camera; and the plurality of cameras in the first constituent array camera capture image data at a higher angular resolution than the image data captured by the plurality of cameras in the second constituent array camera. Also included are a processor and memory containing an image processing application and calibrated warp data, where the image processing application directs the processor to: obtain image data from the cameras in the first and second constituent array cameras; generate separate depth maps using the image data captured by each of the first and second constituent array cameras; and synthesize separate high resolution images by performing a super-resolution process using the image data captured by each of the first and second constituent array cameras and the depth maps generated using the image data captured by each of the first and second constituent array cameras; and construct an enhanced image using the two synthesized images and the depth maps used to synthesize images by: warping a first of the synthesized images into a viewpoint of a second of the synthesized images using the depth map used to synthesize the first of the synthesized images and calibrated warp data; and blending the first of the synthesized images warped into the viewpoint of the second of the synthesized images and the second of the synthesized images to create the enhanced image. Furthermore, the enhanced image has a field of view of the image synthesized using the image data captured by the second constituent array camera and includes a foveated high resolution region with an angular resolution of the image synthesized from the image data captured by the first constituent array camera.

Another further embodiment includes: a constituent array camera including a plurality of cameras, where each camera incorporates optics that form an image on a focal plane defined by an array of pixels that capture image data and have fields of view that form a combined field of view in a first viewing direction; a separate camera incorporating optics that form an image on a focal plane defined by an array of pixels that capture image data; and having a field of view in a second viewing direction; a processor; and memory containing an image processing application and calibrated warp data, where the image processing application directs the processor to: obtain image data from the cameras in the constituent array camera; capture an image using the separate camera from a viewpoint; generate a depth map using the image data captured by the constituent array camera; synthesize an image using the image data captured by the constituent array camera and the depth map; and construct an enhanced image using the image captured by the separate camera, the synthesized image, and the depth map used to synthesize the synthesized image by: warping the synthesized image into the viewpoint of the image captured by the separate camera using the calibrated warp data and the depth map; and blending the synthesized image warped into the viewpoint of the image captured by the separate camera and the image captured by the separate camera to create the enhanced image.

BRIEF DESCRIPTION OF THE DRAWINGS

FIG. 4A illustrates an array camera configuration that includes two constituent array cameras, where the first constituent array camera has a field of view that is narrower and within the field of view of second constituent array camera.

FIG. 4B illustrates an array camera configuration that includes two constituent array cameras, where the first constituent array camera has a field of view that is directly adjacent to the field of view of the second constituent array camera.

FIGS. 6A and 6B illustrate an array camera configuration that includes two constituent array cameras, where the first constituent array camera has a field of view that is directly adjacent to the field of view of the second constituent array camera, relative to an image that can be constructed from image data provided by the array camera configuration.

DETAILED DESCRIPTION

Figure 1:
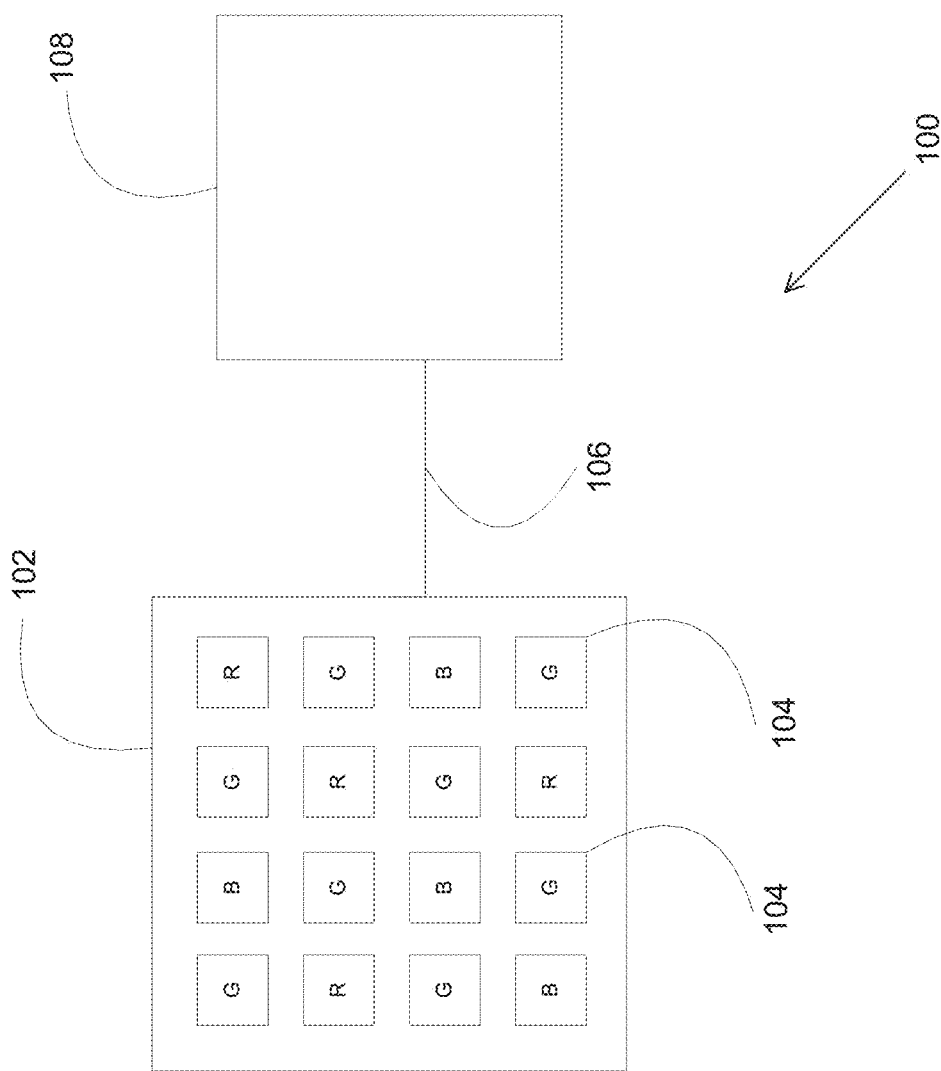
FIG. 1 illustrates an array camera architecture that can be implemented within a constituent array camera in accordance with embodiments of the invention.

Turning now to the drawings, systems and methods for implementing array camera configurations that include a plurality of constituent array cameras, where each constituent array camera provides a distinct field of view and/or a distinct viewing direction, are illustrated. Array cameras that can be used as the constituent array cameras that capture image data correlating with different fields of view are disclosed in U.S. patent application Ser. No. 12/935,504, entitled "Capturing and Processing of Images using Monolithic Camera Array with Heterogenous Images" to Venkataraman et al., the disclosure of which is incorporated by reference herein in its entirety. U.S. patent application Ser. No. 12/935,504 is now published as U.S. Patent Publication No. 2011/0069189, the disclosure from which related to array camera architectures is also incorporated by reference herein in its entirety. The monolithic array camera modules illustrated in U.S. patent application Ser. No. 12/935,504 can be constructed from an optic array of lens stacks—each lens stack in the array defining an optical channel—and an imager array including a plurality of focal planes corresponding to the optical channels in the optic array. The combination of a lens stack and its corresponding focal plane can be understood to be a 'camera' (as opposed to an 'array camera'). Typically, array cameras can capture image data that can be used to form multiple images of a single scene, and can process the image data to yield a single image of the scene with improved image properties. For example, each of the constituent cameras can capture image data that can be used to form an image of the scene from the perspective of the respective camera. Of course, an image corresponding with a respective camera will be slightly offset with respect to images corresponding with other cameras, and the extent of the offset will be based upon the location of the corresponding camera relative to that of the other cameras. In many embodiments, the cameras within an array camera are configured to provide non-redundant information about the scene. Accordingly, super-resolution processes such as those described in U.S. patent application Ser. No. 12/967,807 entitled "Systems and Methods for Synthesizing High Resolution Images Using Super-Resolution Processes" to Lelescu et al., can be utilized to synthesize a higher resolution 2D image or a stereo pair of higher resolution 2D images from the lower resolution images in the light field captured by an array camera. The disclosure of U.S. patent application Ser. No. 12/967,807 is hereby incorporated by reference in its entirety. Furthermore, U.S. patent application Ser. No. 12/967,807 has published as U.S. Patent Publication No. 2012/0147205, the relevant disclosure from which related to depth estimation, fusion and super-resolution processing is hereby incorporated by reference in its entirety. Of course, the image data obtained by an array camera can be processed in any number of ways. For example, because an array camera can construct images of a scene from different perspectives, it can thereby provide depth information about a scene.

The disclosure of U.S. Patent Application Ser. No. 61/798,673, entitled "Systems and Methods for Stereo Imaging with Camera Arrays" to Venkataraman et al., discusses array camera configurations that implement multiple array cameras, where each array camera has substantially the same field of view and substantially the same general viewing direction, but captures image data from a scene from a different viewpoint. The term viewing direction is used to refer to the direction of the optical axis of the cameras in an array camera. Subject to tolerances imposed by the limitations of the processes used to manufacture the optics of a constituent array camera, the cameras in the constituent array camera generally have parallel optical axes. The viewing direction of a constituent array camera can be considered to be an axis perpendicular to a plane defined by the back focal lengths of the constituent array cameras and/or by the average of the back focal lengths of the constituent array cameras. As explained in U.S. Patent Application Ser. No. 61/798,673, the accuracy of depth information about a scene is a function of the disparity between corresponding pixels in respective images. Thus, two array cameras spaced a distance apart, where the distance between the two array cameras is greater than the distance between adjacent cameras in a single array camera, can provide images that have greater disparity for corresponding pixels and therefore greater depth information as compared with either of the two array cameras individually. Accordingly, the diversity of image information acquired from the different array cameras can be used to calculate the depth of objects within the scene to a greater accuracy relative to that which can be achieved by any one of the array cameras individually. This information can then be used, for example, to develop stereoscopic images of the scene. Of course, the diversity of image information can be used for a variety of purposes. The disclosure of U.S. Patent Application Ser. No. 61/798,673 is hereby incorporated by reference in its entirety. U.S. patent application Ser. No. 14/216,967 claims priority to U.S. Patent Application Ser. No. 61/798,673 and is published as U.S. Patent Publication No. 2014/0267633. The disclosure in U.S. Patent Publication No. 2014/0267633 related to array camera configurations that implement multiple array cameras in accordance with embodiments of the invention is hereby by incorporated by reference in its entirety.

In many embodiments of the invention, array camera configurations include a processor configured by an image processing application stored in memory and a plurality of constituent array cameras, where each constituent array camera has a distinct field of view and/or a distinct viewing direction (i.e., with respect to a targeted scene). In many embodiments, at least one constituent array camera has a viewing direction that overlaps with at least one other constituent array camera. Constituent array cameras that have overlapping viewing direction can each capture corresponding image data (e.g. image data pertaining to a region of a scene that is within the fields of view of each of the two constituent array cameras) that can be advantageously processed in any variety of ways. For example, in some embodiments, the cameras in a first constituent array camera of the array camera configuration have a first combined field of view, and the cameras in a second constituent array camera have a second combined field of view that is broader than, and encompasses, the first combined field of view. In many embodiments, although the first combined field of view is narrower than and within the second combined field of view, the first constituent array camera can capture the same amount of image data such that it can construct a higher resolution image of that portion of a scene that is within its combined field of view relative to that which can be constructed by the second constituent array camera. In effect, the first constituent camera has a greater sampling density per object area since it has a larger magnification and thus the same image area as the second constituent camera is associated with a much smaller part of the scene and consequently finer resolved on the sensor. As a result, the image data captured by the cameras in the first constituent array camera is of higher angular resolution than the image data captured by the cameras in the second constituent array camera. Further, as the second constituent array camera has a combined field of view that is broader than that of the first array camera, the image data captured by the first array camera can be collocated with the image data captured by the second array camera using a depth map generated by either or both of the constituent array cameras and a calibrated warp to provide an image that reflects the broader field of view of the second constituent array camera, but also has a high-resolution foveated region that reflects the higher angular resolution and greater sampling density of the first constituent array camera. The foveated region can be magnified, and thus the array camera configuration can provide a zoom feature without any moving parts. Processes for warping an image synthesized from image data captured by a first constituent camera into the viewpoint of an image synthesized from image data captured by a second constituent array camera in accordance with various embodiments of the invention are discussed further below.

In many embodiments, an array camera configuration includes a processor configured by an image processing application stored in the memory of the array camera configuration and a plurality of constituent array cameras that have viewing directions that result in the constituent array cameras having combined fields of view that are adjacent to one another and that can have a small overlapping region to aid with the warping of an image synthesized using image data captured by a first constituent array camera from a first viewpoint into the viewpoint of an image synthesized using image data captured by a second constituent array camera. Accordingly, with adjacent viewing directions that result in the constituent cameras having combined fields of view that are adjacent to one another, each of the plurality of constituent array cameras can provide a different set of image data that can be aggregated, and used to construct a broader image that reflects the viewing directions of the constituent array cameras in combination. In this way, each constituent array camera can sample a smaller region of a scene and thereby provide image data with greater angular precision. In several embodiments, an array camera configuration includes a first constituent array camera that has a first viewing direction, and a second constituent array camera that has a second viewing direction that results in a combined field of view adjacent to the combined field of view of the cameras in the first constituent array camera. In this way, each constituent array camera can provide image data that can be warped into the same viewpoint to form a broader image reflecting image data captured within the combined fields view of both constituent array cameras.

The image data provided by each constituent array camera can of course be used in any number of ways in accordance with embodiments of the invention. For example, in a number of embodiments, an array camera configuration includes a processor that is directed by an image processing application stored in the memory of the array camera configuration to compare image data from each of at least two constituent array cameras to determine a corresponding set of image data; computation is then performed on the corresponding image data to ascertain the baseline distance between the at least two constituent array cameras. The baseline distance information may be used in further computations. In several embodiments, the array camera configuration includes a processor that is configured by an image processing application to determine a depth map for each constituent array camera, synthesize a high resolution image using a fusion and/or super-resolution process from the image data captured by a constituent array camera using the depth map, and then warp the each synthesized image into a common viewpoint using the image's corresponding depth map and a calibrated warp determined with respect to each of the warped images. In a number of embodiments, one of the images is synthesized from a reference viewpoint and is not warped as part of the process of combining the images.

In many embodiments, an array camera configuration includes a processor that is configured to facilitate parallax computations for a constituent array camera using parallax computation information obtained using image data captured by a second constituent array camera. In numerous embodiments, an array camera configuration includes a processor that is configured to apply super-resolution algorithms to a set of image data that includes image data captured by cameras in a first constituent array camera and a second constituent array camera. In many embodiments, an array camera configuration includes a processor that is configured to compute a high resolution depth map using image data captured by a first constituent array camera and a second constituent array camera. In some embodiments, an array camera configuration is configured to compute depth information about an object within a scene whether or not the object is within the field of view of one constituent array camera or a plurality of constituent array cameras.

Although much of the discussion that follows relates to array camera configurations incorporating multiple constituent array cameras, it should be appreciated that similar results can be achieved by pairing a constituent array camera with a single (legacy) camera possessing an appropriate field of view. In this way computational complexity can be reduced, while obtaining the benefits of utilizing a constituent array camera, which can include increased depth estimation precision, and improved imaging performance relative to a stereo pair of legacy cameras. Accordingly, the discussion that follows should be understood as not limited to array camera configurations that utilize multiple constituent array cameras and understood more broadly as applying to any combination of constituent array cameras and constituent cameras appropriate to the requirements of specific applications. Array camera configurations, array camera architectures that can be utilized to implement constituent array cameras, and the combination of constituent array cameras and constituent cameras in accordance with various embodiments of the invention are discussed below.

Array Camera Architectures

Constituent array cameras in accordance with many embodiments of the invention can include one or more array camera modules and a processor. An array camera module can include an optic array of lenses and an imager array, which is a sensor that includes an array of focal planes. Each focal plane can include an array of pixels used to capture an image formed on the focal plane by a lens stack. The focal plane can be formed of, but is not limited to, traditional CIS (CMOS Image Sensor), CCD (charge-coupled device), high dynamic range sensor elements, multispectral sensor elements and various alternatives thereof. In many embodiments, the pixels of each focal plane have similar physical properties and receive light through the same lens stack. Furthermore, the pixels in each focal plane may be associated with the same color filter. In a number of embodiments, at least one of the focal planes includes a Bayer-pattern filter. In several embodiments, the focal planes are independently controlled. In other embodiments, the operation of the focal planes in the imager array is controlled via a single set of controls. Array cameras are discussed in U.S. patent application Ser. No. 13/106,797 entitled "Architectures for imager arrays and array cameras" and U.S. patent application Ser. No. 12/952,106 entitled "Capturing and processing of images using monolithic camera array with heterogenous imagers"; the disclosure of both applications is hereby incorporated by reference in its entirety. U.S. patent application Ser. No. 13/106,797 is now published as U.S. Patent Publication No. 2012/0013748, the relevant disclosure from which related to implementation of imager arrays is hereby incorporated by reference herein in its entirety. U.S. patent application Ser. No. 12/952,106 has now issued as U.S. Pat. No. 8,514,491, the relevant disclosure concerning the implementation of optics, sensors and array camera modules for use in array cameras is hereby incorporated by reference in its entirety.

A sensor including a single array of pixels on which images are formed by the optics of each camera can also be utilized to capture image data. In several embodiments, each camera includes a separate sensor. In many embodiments, individual lens barrels are utilized to implement the optics of the camera. Array camera modules incorporating cameras implemented using combinations of separate sensors and optic arrays, separate sensors and separate lens barrels and a single sensor and separate lens barrels in accordance with embodiments of the invention are disclosed in U.S. patent application Ser. No. 14/536,537 entitled "Methods of Manufacturing Array Camera Modules Incorporating Independently Aligned Lens Stacks" to Rodda et al. filed Nov. 7, 2014, the relevant disclosure from which is incorporated by reference herein in its entirety. Light filters can be used within each optical channel formed by the optics of a camera in the array camera module to enable different cameras to capture image data with respect to different portions of the electromagnetic spectrum.

An array camera architecture that can be used in a variety of array camera configurations in accordance with embodiments of the invention is illustrated in FIG. 1. The array camera 100 includes one or more array camera modules 102 that is configured to transmit 106 image data to a receiving device 108 via an interface format involving the transmission of additional data describing the transmitted image data. In many embodiments, the receiving device is a processor configured by software, such as an image processing application, stored in memory. The processor can be any of or any combination of a general purpose processor, a graphics processing unit (GPU) or co-processor, a machine vision processing unit or co-processor, and/or a custom circuit designed for the requirements of a specific application. The array camera module 102 includes an array of cameras 104. The cameras 104 in the array camera module 102 can be formed from a combination of a lens stack and a focal plane. The array camera module 102 can include an optic array of lens stacks and an imager array of focal planes. The array camera module 102 can also be implemented using individual lens barrels and/or using separate sensors for each focal plane. These multiple cameras 104 may be active or inactive at any given time. The image data captured by these multiple cameras may be transmitted from the focal planes of each camera to a processor. The focal planes may have different imaging characteristics, such as varying exposure times, start times, and end times. Therefore, the timing of the transmission of the image data captured by each focal plane can vary. Accordingly, the imager array can transmit additional data describing the image data to enable a device receiving the image data to appropriately reconstruct images from the received image data. The transmission of array camera image data is disclosed in U.S. patent application Ser. No. 13/470,252, entitled "Systems and Methods for Transmitting and Receiving Array Camera Image Data," the disclosure of which is hereby incorporated by reference. U.S. patent application Ser. No. 13/470,252 is now published as U.S. Patent Publication No. 2012/0278291 the disclosure from which concerning controlling array camera module imaging parameters and reading out image data from an array camera module is hereby incorporated by reference in its entirety.

In many embodiments, the array camera 100 captures images using a plurality of cameras 104, which can have different imaging characteristics. The array camera 100 can separately control each of the cameras to obtain enhanced image capture and/or to enhance processes such as (but not limited to) super-resolution processes that may be applied to the image data captured by one or all of the constituent array cameras. For example, each pixel of a focal plane may capture different wavelengths of light, or may capture the intensity of light, varying exposure times, start times, or end times. Once the array camera 100 has commenced capturing image data using the pixels on the imager array, the focal planes can commence transmitting the image data captured using the pixels to a receiving device 108. The image data captured by different cameras can be interleaved for transmission to a receiving device 108 that includes interface circuitry configured to receive image data. In many embodiments, the interface circuitry is implemented in hardware and/or using a processor. The receiving device 108 can then organize the captured image data from the received packet and appropriately combine the image data to process and/or reconstruct the image(s) captured by one or more of the focal planes in the imager array.

In the illustrated embodiment, image data from multiple images of a scene can be captured by the array camera module 102. As the image data is captured, the array camera module 102 transmits 106 the image data to a receiving device 108. The array camera module 102 transmits the image data using a small number of local data storage cells on the array camera module 102 that store the captured image data following capture by the cameras. In the illustrated embodiment, the array camera module 102 manages the capture and transmission of image data so that the captured image data stored in the storage cells is transmitted by the imager array of the array camera module 102 in the time taken to capture and load the next set of image data into the storage cells. In this way, the array camera module can continuously buffer and transmit image data using a number of local data storage cells that is less than the total number of pixels in the array camera module.

In many embodiments, a line of image data transmitted by an imager array can be considered to equal the number of pixels in a row (column) of a focal plane multiplied by the number of focal planes. In several embodiments, the clock frequency of transmitter circuitry on the imager array is set to a desired output data rate and the internal focal plane pixel rate is set to 1/(M×N) the desired output data rate (where M×N is the total number of focal planes). In many image transmission protocols, once a start of line condition is sent, all of the line of image data is transmitted without interrupt until the end of line. Accordingly, a sufficient number of data storage cells and a buffering mechanism can be developed that starts transmission of pixels once there are sufficient pixels stored such that all of the pixels will have been captured and transmitted by the time the end of the line of image data is reached. If, for example, an imager array including 16 focal planes (as in a 4×4 array) transmits image data from all focal planes, then there is very little or no data storage utilized prior to the start of focal plane readout, because the data is transmitted at approximately the rate that at which it is being read. If, however, the same imager array only has one active imager, then almost all of the pixels from a row (column) of the focal plane are stored since the buffer is being read 16 times as fast as it is being written. Therefore, the data storage requirement would be one row of pixels (i.e. $\frac{1}{16}^{th}$ of a line of image data). When eight focal planes are active, half the data from all eight focal planes is buffered before transmission commences to avoid underflow. Therefore, the total number of data storage cells utilized is equal to four rows of pixels or one quarter of a line of image data. The above examples illustrate how the data storage requirements of an imager array can vary based upon the number of active focal planes. In many embodiments, the total number of storage cells within an imager array is less than a quarter of a line of image data. In several embodiments, the total number of storage cells within an imager array is equal to a line of image data. In several embodiments, the total number of data storage cells is between a quarter of a line of image data and a full line of image data. In a number of embodiments, the total number of storage cells is equal to or greater than a line of image data. When the camera module transmits the captured image data, the incorporation of additional data describing the image data enables a peripheral device receiving the image data to reconstruct the images captured by each active camera in the imager array 102.

Imager arrays in accordance with many embodiments of the invention are configured to output image data via an interface format that accommodates the transfer of image data captured via multiple focal planes. In several embodiments, the imager array is configured to transmit captured image data in accordance with an interface format that is compatible with standard interface formats, such as (but not limited to) the MIPI CSI-2 interface format (MIPI interface format), LVDS SerDes (Serializer-Deserializer), the Camera Link interface format, and any of the Universal Serial Bus (USB) interface formats or FireWire interface formats. When image data captured from multiple focal planes is output by the imager array, the device receiving the image data is faced with the task of assembling the image data into a plurality of images of a scene.

Note that although a 4×4 camera is depicted in FIG. 1, it should of course be understood that an array camera of any suitable dimension can be incorporated in accordance with embodiments of the invention. For example, 3×3 cameras can be implemented, and 2×4 cameras can be implemented. Indeed, one dimensional array cameras can be used as the constituent cameras in accordance with embodiments of the invention. One-dimensional array cameras are disclosed in greater detail in U.S. Provisional Patent Application Ser. No. 61/768,523, entitled "Thin Form Factor Computational Array Cameras Using Non-Monolithic Assemblies," to Venkataraman et al.; the disclosure of U.S. Provisional Patent Application Ser. No. 61/768,523 is incorporated herein by reference in its entirety. Imager array architectures are now discussed below. U.S. patent application Ser. No. 14/188,521 claims priority to U.S. Patent Application Ser. No. 61/768,523 and was published as U.S. Patent Publication No. 2014/0240528. The disclosure from U.S. Patent Publication No. 2014/0240528 relevant to non-monolithic array cameras and linear array cameras is hereby incorporated by reference herein in its entirety.

Imager Array Architectures

Figure 2:
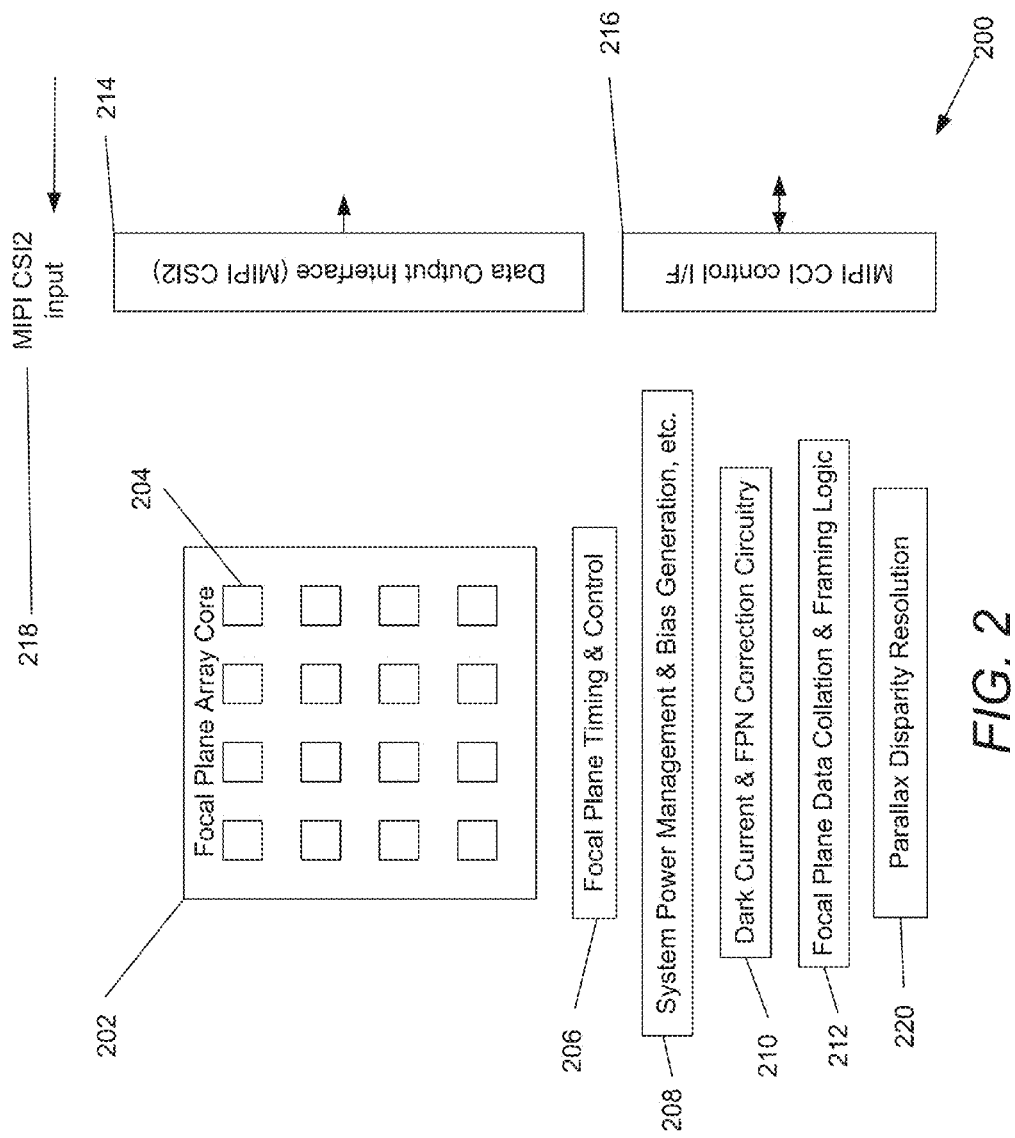
FIG. 2 illustrates an imager array architecture that can be implemented within a constituent array camera in accordance with embodiments of the invention.

An imager array of a constituent array camera in accordance with an embodiment of the invention is illustrated in FIG. 2. The imager array 200 includes a focal plane array core 202 that includes a M×N array of focal planes 204 and all analog signal processing, pixel level control logic, signaling, and analog-to-digital conversion circuitry. In the illustrated embodiment, M and N are 4, but it should be understood that an imager array of any suitable dimension can be implemented in accordance with embodiments of the invention. The imager array also includes focal plane timing and control circuitry 206 that is responsible for controlling the capture of image information using the pixels. For example, in some embodiments, the focal plane timing and control circuitry 206 can synchronize the capture of image data by the focal planes such that active focal planes capture image data from a scene during the same shutter time interval. In many embodiments, the focal plane timing and control circuitry 206 causes the active focal planes to capture image data from a scene in a particular controlled sequence. In a number of embodiments, the focal plane timing and control circuitry 206 utilizes reset and read-out signals to control the integration time of the pixels. In several embodiments, any of a variety of techniques can be utilized to control integration time of pixels and/or to capture image information using pixels. In many embodiments, the focal plane timing and control circuitry 206 provides flexibility of image information capture control, which enables features including (but not limited to) high dynamic range imaging, high speed video, and electronic image stabilization. In various embodiments, the imager array 200 includes power management and bias generation circuitry 208. The power management and bias generation circuitry 208 provides current and voltage references to analog circuitry such as the reference voltages against which an ADC would measure the signal to be converted against. In many embodiments, the power management and bias circuitry also includes logic that turns off the current/voltage references to certain circuits when they are not in use for power saving reasons. In several embodiments, the imager array includes dark current and fixed pattern (FPN) correction circuitry 210 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN. In many embodiments, the System on a Chip ("SOC") imager includes focal plane framing circuitry 212 that packages the data captured from the focal planes into a container file and can prepare the captured image data for transmission. In several embodiments, the focal plane framing circuitry 212 includes information identifying the focal plane and/or group of pixels from which the captured image data originated. In a number of embodiments, the imager array 200 also includes an interface for transmission of captured image data to external devices. In the illustrated embodiment, the interface is a MIPI CSI 2 output interface supporting four lanes that can support read-out of video at 30 fps from the imager array and incorporating data output interface circuitry 214, interface control circuitry 216 and interface input circuitry 218. Typically, the bandwidth of each lane is optimized for the total number of pixels in the imager array and the desired frame rate. The use of various interfaces including the MIPI CSI 2 interface to transmit image data captured by an array of imagers within an imager array to an external device in accordance with embodiments of the invention is described in in U.S. patent application Ser. No. 13/470,252, cited to and incorporated by reference above.

An imager array in accordance with embodiments of the invention can include a single controller that can separately sequence and control each focal plane. Having a common controller and I/O circuitry can provide important system advantages including lowering the cost of the system due to the use of less silicon area, decreasing power consumption due to resource sharing and reduced system interconnects, simpler system integration due to the host system only communicating with a single controller rather than M×N controllers and read-out I/O paths, simpler array synchronization due to the use of a common controller, and improved system reliability due to the reduction in the number of interconnects.

Additionally, an imager array in accordance with many embodiments of the invention may include a parallax disparity resolution module 220 that can determine disparity between pixels in different images captured by the camera array using parallax detection processes similar to those described in U.S. patent application Ser. No. 13/972,881 entitled "Systems and Methods for Parallax Detection and Correction in Images Captured Using Array Cameras that Contain Occlusions using Subsets of Images to Perform Depth Estimation" to Ciurea et al., the disclosure of which is incorporated by reference herein in its entirety. U.S. patent application Ser. No. 13/972,881 is now issued as U.S. Pat. No. 8,619,082. The relevant disclosure of U.S. Pat. No. 8,619,082 is hereby incorporated by reference in its entirety.

Although specific components of an imager array architecture are discussed above with respect to FIG. 2, any of a variety of imager arrays can be implemented in accordance with embodiments of the invention that enable the capture of images of a scene at a plurality of focal planes in accordance with embodiments of the invention. Array camera modules that incorporate imager arrays and an optic array of lens elements are discussed below.

Array Camera Modules

Array camera modules are fundamental components within the constituent array cameras and include an M×N optic array of lens stacks and an imager array and/or multiple sensors that include an M×N array of focal planes. Each lens stack in the optic array defines a separate optical channel. The optic array may be mounted to an imager array that includes a focal plane for each of the optical channels, where each focal plane includes an array of pixels or sensor elements configured to capture an image. When the optic array and the imager array are combined with sufficient precision, the array camera module can be utilized to capture image data from multiple images of a scene that can be read out to a receiving device, e.g. a processor, for further processing, e.g. to synthesize a high resolution image using super-resolution processing. In many embodiments, each lens stack is separately aligned with respect to a focal plane. In several embodiments, the imager array is implemented using multiple sensors mounted to a substrate. In a number of embodiments, the imager array is implemented using a single sensor. In certain embodiments, the sensor contains a single array of pixels and images are formed by each of the lens stacks on different regions of the array. In other embodiments, a single sensor includes a separate array of pixels for each focal plane.

Figure 3:
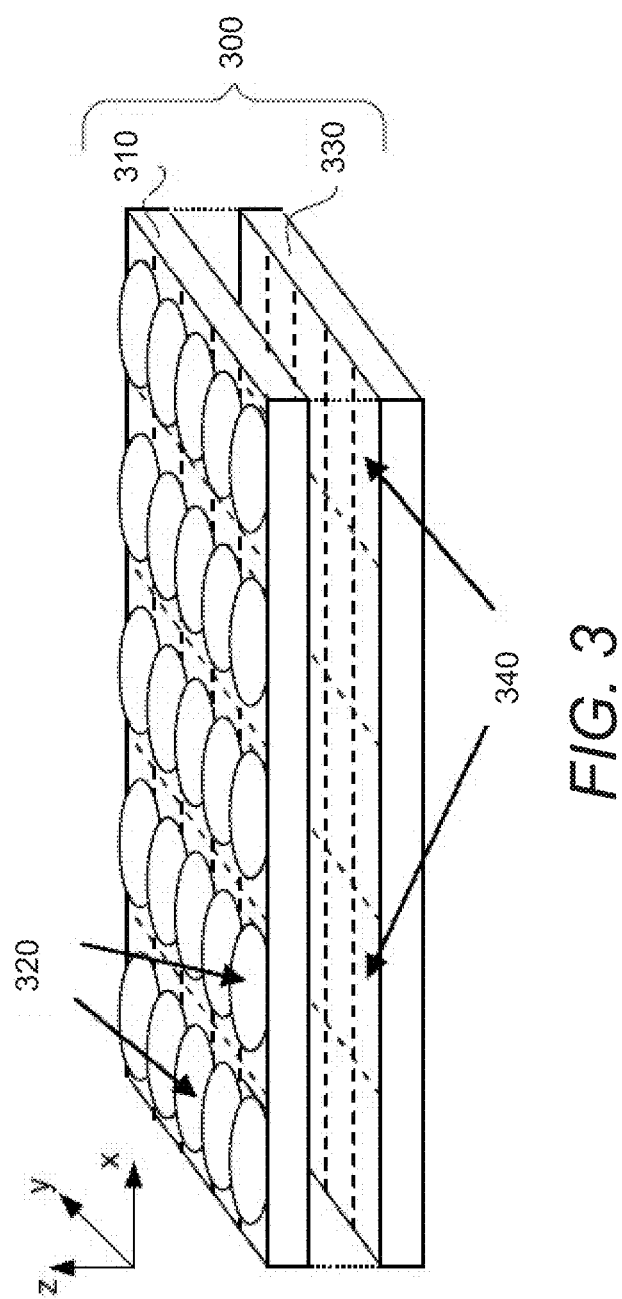
FIG. 3 illustrates an array camera module of a constituent array camera in accordance with embodiments of the invention.

An exploded view of an array camera module formed by combining a lens stack array with a monolithic sensor including an array of focal planes in accordance with an embodiment of the invention is illustrated in FIG. 3. The array camera module 300 includes an optic array 310 including M×N distinct lens stacks forming a total of M×N separate apertures and an imager array 330 that includes a M×N array of focal planes 340. Each lens stack 320 in the optic array 310 creates an optical channel that resolves an image on one of the focal planes 340 on the sensor 330 on the imager array. Each of the lens stacks 320 may be of a different type. In several embodiments, the optical channels are used to capture images of different portions of the wavelength of light spectrum (e.g. using color filters, located either within the lens stack or on the sensor) and the lens stack in each optical channel is specifically optimized for the portion of the spectrum imaged by the focal plane associated with the optical channel. In several embodiments, the lens stacks differ based upon the specific portion of the spectrum imaged by a particular camera. In a number of embodiments, at least one surface of a lens element in the lens stacks differ based upon then specific portion of the spectrum imaged by a particular camera. In several embodiments, the materials used in the construction of at least one lens element in the lens stacks differ based upon then specific portion of the spectrum imaged by a particular camera. For example, in some embodiments, several of the optical channels may be configured to only image those areas of a scene that emit light having a wavelength that corresponds with the blue portion of the electromagnetic spectrum. Of course, many different types of cameras can be incorporated within an array camera module in accordance with embodiments of the invention. For example, infrared cameras and polychromatic cameras may be incorporated. Additionally, the M×N array may be patterned with cameras in any suitable manner in accordance with embodiments of the invention. For example, π filter groups can be patterned onto the array camera module. The patterning of an array camera module with π filter groups is disclosed in U.S. patent application Ser. No. 13/875,248, entitled "Camera Modules Patterned with Pi Filter Groups," to Venkataraman et al.; the disclosure of U.S. patent application Ser. No. 13/875,248 is incorporated herein by reference. U.S. patent application Ser. No. 13/875,248 has now published as U.S. Patent Publication No. 2013/0293760 the disclosure concerning π filter groups contained therein and with respect to the patterning of array cameras with different spectral filter patterns is hereby incorporated by reference in its entirety.

In many embodiments, the array camera module 300 includes lens stacks 320 having one or multiple separate optical lens elements axially arranged with respect to each other. Optic arrays of lens stacks 310 in accordance with several embodiments of the invention include one or more adaptive optical elements that can enable the independent adjustment of the focal length of each lens stack and/or lateral shifting of the centration of the refractive power distribution of the adaptive optical element. The use of adaptive optical elements is described in U.S. patent application Ser. No. 13/650,039, entitled "Lens Stack Arrays Including Adaptive Optical Elements", filed Oct. 11, 2012, the disclosure of which is incorporated by reference herein in its entirety. U.S. patent application Ser. No. 13/650,039 has now published as U.S. Patent Publication No. 2014/0088637, the relevant disclosure from which related to adaptive optical elements and the inclusion of adaptive optical elements within the optical channels of cameras in an array camera to control back focal length and to shift field of view is hereby incorporated by reference herein in its entirety.

In several embodiments, the array camera module employs wafer level optics (WLO) technology. WLO is a technology that encompasses a number of processes, including, for example, molding of lens arrays on glass wafers, stacking of those wafers (including wafers having lenses replicated on either side of the substrate) with appropriate spacers, followed by packaging of the optics directly with the imager into a monolithic integrated module. The WLO procedure may involve, among other procedures, using a diamond-turned mold to create each plastic lens element on a glass substrate. More specifically, the process chain in WLO generally includes producing a diamond turned lens master (both on an individual and array level), then producing a negative mold for replication of that master (also called a stamp or tool), and then finally forming a polymer replica on a glass substrate, which has been structured with appropriate supporting optical elements, such as, for example, apertures (transparent openings in light blocking material layers), and filters. Although the construction of lens stack arrays using WLO is discussed above, any of a variety of techniques can be used to construct lens stack arrays, for instance those involving precision glass molding, polymer injection molding or wafer level polymer monolithic lens processes.

Although certain array camera module configurations have been discussed above, any of a variety of suitable array camera modules that utilize lens stacks and focal planes may be implemented in accordance with embodiments of the invention. For example, in many embodiments, 'non-monolithic' array camera modules may be implemented. Non-monolithic' array camera modules are typically constructed by independently aligning individual lenses or multiple arrays of lenses with one or more sensors to create an array camera module. Such array camera configurations are disclosed in U.S. patent application Ser. No. 14/536,537, the relevant disclosure from which is incorporated by reference above.

Array Camera Configurations Including a Plurality of Constituent Array Cameras and/or Constituent Cameras where Each Constituent Array Camera has a Distinct Field of View and/or Viewing Direction In many embodiments of the invention, an array camera configuration includes a plurality of constituent array cameras, whereby each constituent array camera has a distinct combined field of view and/or viewing direction; the configuration also includes a processor that can aggregate image data provided by each constituent array camera and thereby construct an enhanced image using the data. In many embodiments, the constituent array cameras do not include their own respective processing elements or receiving devices; instead, the processor for the array camera configurations provides the functionality usually accomplished by a constituent array camera's respective receiving device. Of course, any suitable way for processing the image data obtained by the constituent array camera modules may be implemented in accordance with embodiments of the invention.

An array camera configuration that includes two constituent array cameras that each have a distinct combined fields of view in accordance with embodiments of the invention is illustrated in FIG. 4A. In particular, the array camera configuration 400 includes a first constituent array camera 402 having a combined field of view that encompasses the fields of view of its constituent lenses—the field of view of one such lens 404 (indicated by the dotted lines) is depicted, and that includes a lens stack array 406, an imager array 408, and a processor 410. The configuration 400 further includes a second constituent array camera 412, having a second combined field of view that encompasses the fields of view of its constituent lenses—the field of view of one such lens 414 (indicated by the dashed lines) is depicted, the field of view 414 of the camera from the second constituent array camera being broader than the field of view 404 of the camera from the first constituent array camera. The cameras in the first constituent array camera can incorporate a 'telephoto lens' that has a high angular resolution and contrast; typically, the telephoto lens will have a comparatively large focal length, and thereby an associated narrow field of view. On the other hand, the cameras in the second constituent array camera can incorporate wide angle optics to achieve a broad viewing angle. Both constituent array cameras communicate with a processor 414 that controls the configuration and processes image data obtained from the constituent array cameras. In the illustrated embodiment, the field of view 404 of a camera in the first constituent array camera is depicted as being narrower and within the field of view 414 of a camera in the second constituent array camera. However, it should be understood, that the optical configurations of the constituent cameras can be distinct in any number of ways in accordance with embodiments of the invention. For example, in some embodiments, the viewing directions of the constituent cameras are adjacent to one another such that the constituent array cameras have fields of view that are partially overlapping and adjacent to each other enabling mosaicking of the image data captured by the constituent array cameras.

In many embodiments, each constituent camera is sufficiently complete in its spectral sampling, such that the chances of developing parallax artifacts and occlusion zones are reduced. In embodiments where constituent camera arrays include different types of cameras, occlusions can be reduced by configuring the array so that each type of camera is placed on either side of a reference camera. This may be achieved by patterning it filter groups onto the constituent array cameras.

An array camera configuration that includes two constituent array cameras that have viewing directions that are adjacent to each other is illustrated in FIG. 4B. In particular, the array camera configuration 450 includes a first constituent array camera 452 having a first combined field of view that encompasses the fields of view of its constituent lenses—the field of view of one such lens 454 (indicated by the dashed lines) is depicted, and a second constituent array camera 462 having a second combined field of view that encompasses the fields of view of its constituent lenses—the field of view of one such lens 464 (indicated by the dashed lines) is depicted that is adjacent to the field of view 454 of the camera from the first constituent array camera. Note that the constituent array cameras are angled such that the combined fields of view of the constituent array cameras can be substantially adjacent to one another (with some overlap) for most (if not all) object distances. Of course, it should be understood that this aspect can be achieved in any suitable way. For example, in some embodiments, only the viewing directions of the lenses are tilted. In a number of embodiments, the cameras squint into different directions due to their internal alignment.

In many embodiments, the fields of view and/or viewing directions of the constituent array cameras are determined by configuring the lens stack arrays of the respective array camera modules. For example, the surface topology of the lens elements may be manipulated so as to obtain the desired field of view and/or viewing direction for each camera in a constituent array camera. Similarly, the material from which the lens elements are formed may be chosen to achieve a desired field of view and/or viewing direction. Note that, generally speaking, as the field of view narrows, the effective focal length increases. Thus, for example, where an array camera configuration includes constituent array cameras having a constituent array camera with a broad combined field of view and one with a narrow combined field of view, those two array cameras may have different focal lengths. In some embodiments, a field flattener footprint may be implemented to accommodate scenarios where the focal length is small such that the imager array is disposed relatively close to the lens stack array. In a number of embodiments, a constituent array camera incorporates an autofocus feature, for example to accommodate large effective focal lengths. In many embodiments lens stacks within a constituent array camera employ flint and crown elements to provide sufficient achromatization effects In many embodiments, the processor for the array camera configuration is configured to be able to synchronize the capturing of images for each respective constituent array camera. In this way, for example, corresponding image data from each constituent array camera can be warped into a single viewpoint and interpolated to construct an enhanced image. In many embodiments, depth estimates for pixels utilized in the enhanced image can be utilized to create a depth map for the enhanced image. Further, in numerous embodiments, the processor for the array camera configuration can be directed by an image processing application to independently control each constituent array camera in many respects. For example, each constituent array camera can capture an image of a scene with a different exposure and gain with respect to other constituent array cameras. Accordingly, the different array cameras can provide image data that can be used to generate a high dynamic range image. Additionally, in many embodiments, one of the constituent array cameras can be instructed by the processor to run in 'binned' mode. Binning can allow a constituent array camera to have improved readout speeds and improved signal to noise ratios, although at the expense of reduced spatial resolution. Accordingly, an array camera employing binning can be better adapted at capturing images where there is a significant amount of motion. In many embodiments of the invention, an array camera configuration can have a constituent array camera operate in binned mode, while another constituent array camera can operate normally. In this way, the array camera operating in binned mode can obtain image data for fast moving objects within a scene, while another array camera operating normally can capture image data with greater spatial resolution.

Although the figures corresponding to the discussion above depict two constituent array cameras, it should be understood that array camera configurations can include any number of constituent array cameras in accordance with embodiments of the invention. For example, in some embodiments, an array camera configuration includes three constituent array cameras, where at least one of the constituent array cameras has a different combined field of view and/or viewing direction than at least one of the other constituent array cameras. Image data captured by the constituent array cameras may then be processed in any variety of ways in accordance with embodiments of the invention. In several embodiments, constituent array cameras can also be used in combination with one or more separate cameras. The depth map generated by the constituent array camera(s) can be used to warp images synthesized from image data captured by the constituent array camera(s) into the viewpoint of a separate conventional camera and the image data interpolated. An array camera configuration that includes constituent array cameras whereby one of the array cameras has a combined field of view that is narrower and within that of a second array camera is now discussed.

Array Camera Configurations Implementing a Constituent Array Camera that has a Combined Field of View that is Narrower and Within that of a Second Constituent Array Camera or Conventional Camera In many embodiments, array camera configurations are provided that implement a first constituent array camera and a second constituent array camera, where the combined field of view of the first constituent array camera is narrower and within the field of view of the second constituent array camera. In other embodiments, a separate conventional camera having a broader field of view than the combined field of view of the first constituent array camera is used in place of the second constituent array camera. The first constituent array camera can thereby image that portion of a scene within its field of view with greater sampling density relative to that of the second constituent array camera. In this way, the processor of the array camera configuration can aggregate image data obtained from the constituent array cameras, for example, such that an enhanced image reflecting the broader second field of view but also having a foveated region of the first field of view can be constructed. Similarly using these principles, an 'optical zoom' feature can be achieved; i.e., the foveated region can be magnified while still providing adequate resolution since that portion of the image is higher in resolution. Note that this zoom feature can be achieved without having to compromise the F#, which typically happens in legacy cameras employing conventional magnification mechanics. In particular, legacy cameras typically rely on moving their lens components to achieve a desired magnification. Thus, the changing of the lens position changes the focal length, and, correspondingly, the F#. Accordingly, the change in the F# may augment the light sensitivity. For example, when a lens is situated in its position of maximum magnification, it can have a relatively large F# and thereby lose significant light sensitivity. Accordingly, where a foveated region is relied on to achieve a zoom function, as in accordance with embodiments of the invention, the potential for the loss of light sensitivity can be avoided.

Figure 5A:
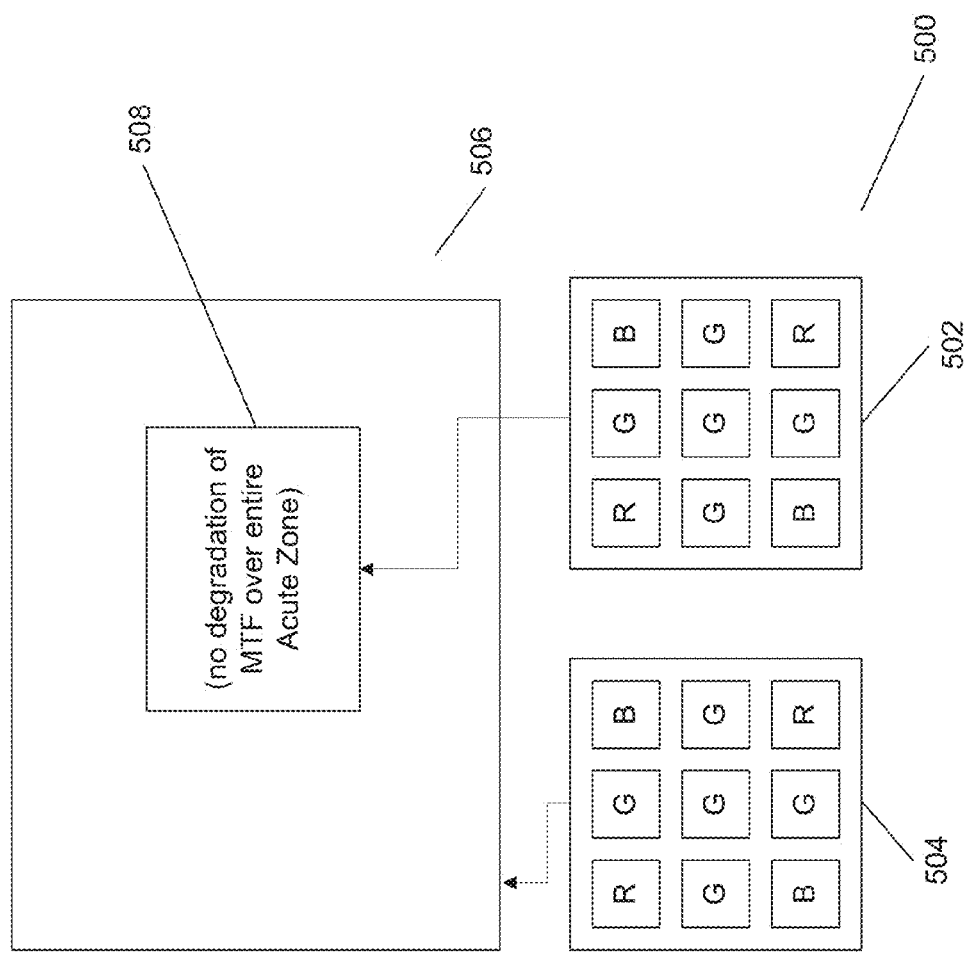
FIGS. 5A and 5B illustrate an array camera configuration that includes two constituent array cameras, where the first constituent array camera has a field of view that is narrower and within the field of view of the second constituent array camera, relative to an image that can be constructed from image data provided by the array camera configuration.
Figure 5B:
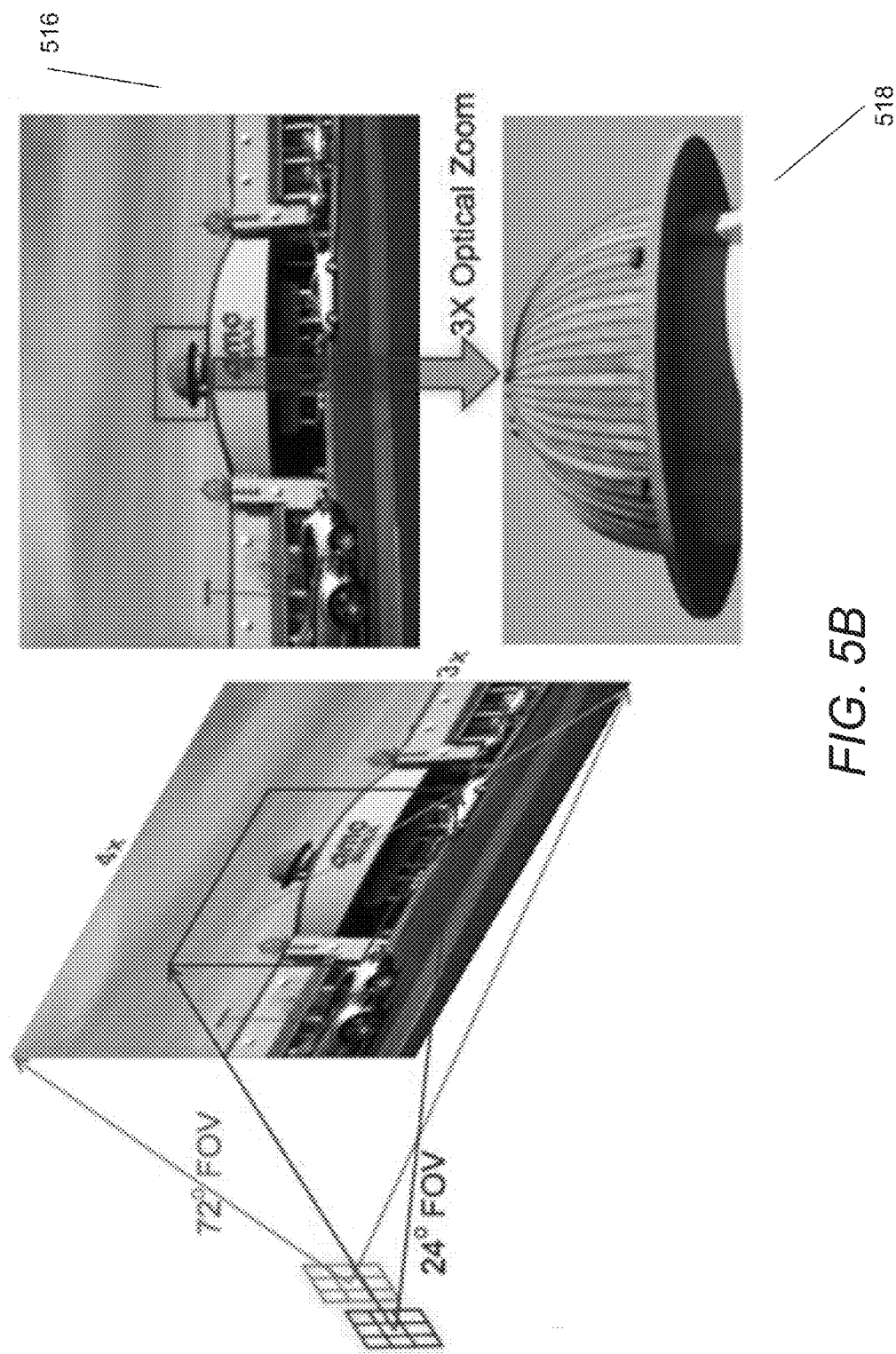

An array camera configuration that includes two constituent array cameras, where the first constituent array camera has a combined field of view that is narrower and within the combined field of view of the second constituent array camera is illustrated in FIGS. 5A and 5B. In particular, FIG. 5A illustrates a schematic for the array camera configuration relative to an image that can be constructed from the image data provided by the constituent array cameras of the array camera configuration. Specifically, in the illustrated embodiment, the array camera configuration includes a first constituent array camera 502 and a second constituent array camera 504. The first constituent array camera 502 has a narrower combined field of view relative to the second constituent array camera 504, and the combined field of view of the first constituent array camera 502 is entirely encompassed within combined field of view of the second constituent array camera 504. Accordingly, image data that is captured by the array camera configuration can be used to produce an image 506, that has a foveated region 508 that is achieved using image data obtained from the first constituent array camera 502. Of course, the foveated region can have improved characteristics in many respects and to any extent in accordance with embodiments of the invention. Additionally, the foveated region can be produced with no or minimal MTF fall off, and is thereby higher in quality. For example, since the first constituent array camera typically includes lenses that are each adapted to resolve spectral bands, and since it has a relatively narrow field of view, in many embodiments the MTF does not degrade with field height. Processes for rendering enhanced images in accordance with many embodiments of the invention can involve synthesizing images using image data captured by each of the constituent array cameras. The process of synthesizing images can involve generation of depth maps and the depth map of at least one of the synthesized images can be used in combination of with calibrated warp data to apply warps to the synthesize image to warp the image into the viewpoint of a second synthesized image. Once the synthesized images are warped into the same viewpoint, an interpolation process can be utilized to combine the image data and construct an enhanced image. In other embodiments, any of a variety of processes for compositing images synthesized from different viewpoints can be utilized as appropriate to the requirements of specific applications.

FIG. 5B diagrams the capturing of image data for a scene of an AMC IMAX theater. The first constituent array camera incorporates cameras having a field of view of 24°, while the second constituent array camera incorporates cameras having a field of view of 72°. The image 516 can be developed by synthesizing images using the image data captured by each of the first and second constituent array cameras. One of the images can then be warped into the viewpoint of the other image using a depth map generated during the image synthesis process and calibrated warp information. The image 516 reflects the broader combined field of view of the second constituent array camera but also has a foveated region 518 that reflects the greater angular precision with which the first constituent array camera samples the scene. Because the foveated region can be constructed at a higher resolution, the foveated region can be magnified while still retaining sufficient resolution. In the illustrated embodiment, it is depicted that the foveated region can be zoomed at 3×. In this way, the array camera configuration provides an optical zoom that has no moving parts. This type of optical zoom can be advantageous relative to conventional zoom mechanisms (i.e. relying on moving lens positions) insofar as optical zoom techniques allow for a significant height advantage relative to what can be achieved using conventional mechanical zoom mechanisms. Of course, it should be understood that the foveated region can have a greater resolution to any extent, and can thereby be magnified to any extent, in accordance with embodiments of the invention.

It should of course be understood that these techniques can be applied in any suitable way in accordance with embodiments of the invention. For example, in some embodiments, an array camera configuration includes multiple constituent array cameras, whereby: a first constituent array camera has a relatively broad combined field of view; and multiple other constituent array cameras have combined fields of view that are narrower and within that of the first constituent array camera. Accordingly, image data provided by the constituent array cameras can be synthesized to produce an image reflecting the broad combined field of view first constituent array camera, but also having multiple foveated regions corresponding to the image data provided by the multiple other constituent array cameras. In some embodiments, several of the 'multiple other constituent array cameras that have narrower combined fields of view' have combined fields of view that are adjacent such that an image can be synthesized that has a larger foveated region corresponding with the narrower, but adjacent, combined fields of view. Alternatively, the foveated region can sample the scene at even higher angular precision due to the narrower combined fields of view of each of the constituent array cameras that contribute to the foveated region. In addition, many array camera configurations use at least one constituent array camera to capture image data that is used to provide a foveated region within an image captured by a single conventional camera with a wider field of view than the combined field of view of the constituent array camera(s). In several embodiments, the array camera configuration includes at least one conventional camera having a field of view that is narrower than the fields of view of cameras in at least one constituent array camera. Image data captured by the at least one conventional camera can be utilized in combination with image data captured by the at least one constituent array camera to synthesize an image having a wider field of view than the fields of view of the at least one conventional camera and with a foveated region having the angular resolution of the image data captured by the cameras in the at least one constituent array camera.

Moreover, in many embodiments, adaptive optical elements—such as those discussed in U.S. patent application Ser. No. 13/650,039, incorporated by reference above—are included within at least one constituent array camera. The inclusion of adaptive optical elements can greatly increase the versatility of an array camera configuration. For example, in many embodiments, the inclusion of adaptive optical elements within a constituent array camera can allow it to have a field of view that is controllable. In particular, as more thoroughly discussed in U.S. patent application Ser. No. 13/650,039, adaptive optical elements can allow constituent cameras to shift their central viewing direction. Thus, in some embodiments, array camera configurations include two constituent array cameras, where a first constituent array camera has a combined field of view that is narrower and within that of a second constituent array camera, and the first constituent array camera further includes adaptive optical elements that can allow its central viewing direction to be shifted. Accordingly, these configurations can produce images whereby the positioning of the foveated region can be controlled by adjusting the central viewing direction of the first constituent array camera. Of course, adaptive optical elements can be included in array camera configurations to achieve any number of functions in accordance with embodiments of the invention. Thus, it should be understood that the above discussion regarding the inclusion of adaptive optical elements is meant to be illustrative and not comprehensive.

Array camera configurations that include multiple constituent array cameras, where the combined fields of view of the constituent cameras are adjacent are now discussed.

Array Camera Configuration Implementing Constituent Array Cameras and/or Constituent Cameras with Adjacent Viewing Directions In many embodiments, array camera configurations are provided that implement a first constituent array camera and a second constituent array camera, where the viewing direction of the first constituent array camera is adjacent that of the second constituent array camera so that the first and second constituent array cameras have fields of view that are adjacent and at least partially overlapping beyond at least a certain distance. In several embodiments, the first constituent array camera has a combined field of view that is adjacent the field of view of a constituent camera. In effect, each constituent array camera or constituent camera can thereby provide image data with respect to a portion of a scene such that the aggregated image data can be used to construct an image that encompasses the portion of the scene sampled by the combined fields of view of all of the cameras in the array camera configuration. In other words, the images that can be produced by each constituent array camera can be 'stitched' to form an image that reflects the viewing directions of the constituent array cameras and/or constituent cameras. In effect, because each constituent array camera or constituent camera captures image data with respect to a smaller field of view (e.g., each constituent array camera images a portion of a scene as opposed to the entire scene), each constituent array camera or constituent camera can capture image data with relatively greater sampling density. Hence, the image data can thereby be used to produce an enhanced image. In embodiments where constituent cameras are utilized, depth information may only be available for the portion of the scene imaged by constituent array cameras. The depth information can then be used to warp an image synthesized using image data captured by the constituent array camera into the viewpoint of another image using a calibrated warp and the images combined using processes including (but not limited to) interpolation. In a number of embodiments, a constituent array camera has a field of view that images a central portion of a scene and constituent cameras located on either side of the constituent array camera image portions of the scene adjacent the central portion of the scene. In this way, depth information is available with respect to objects within the center of the combined field of view of the array camera configuration. In other embodiments, any of a variety of array camera configurations combining constituent array cameras and/or constituent cameras with adjacent fields of view can be utilized as appropriate to the requirements of specific applications.

Figure 6B:
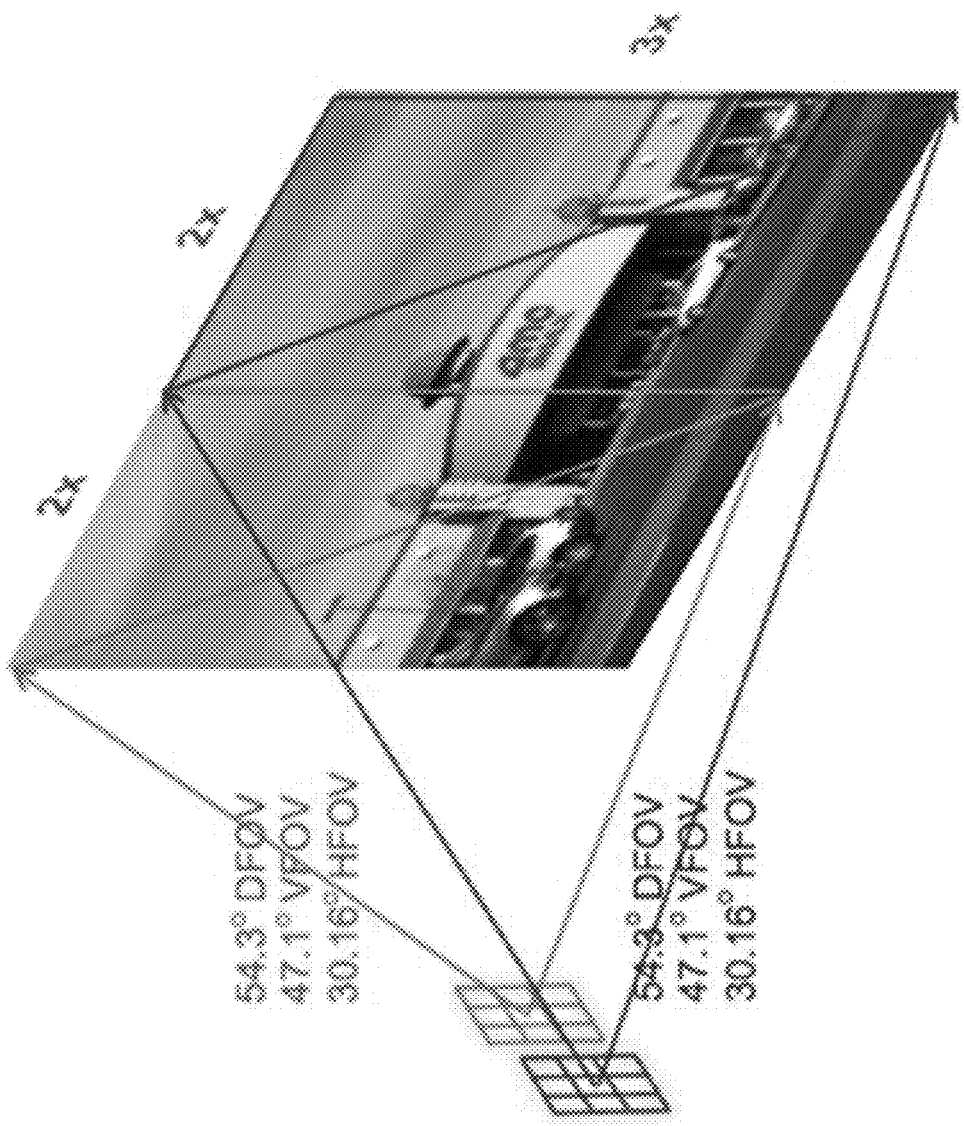

An array camera configuration that includes two constituent array cameras, where a first constituent array camera has a viewing direction that is adjacent that of a second constituent array camera is illustrated in FIGS. 6A and 6B. In particular, FIG. 6A illustrates a schematic for an array camera relative to an image that can be constructed from the image data provided by the array camera configuration. Specifically, in the illustrated embodiment, the array camera configuration includes a first constituent array camera 602 and a second constituent array camera 604. The first constituent array camera 602 has a viewing direction so that the combined field of view is adjacent that of the second constituent array camera 604. Accordingly, image data that is captured by the array camera configuration can be used to produce an image 606, that spans the fields of view of both the first constituent array camera 602 and the second constituent array camera 604. Accordingly, image data from the constituent array cameras 602 and 604 is used to construct the respective halves, 608 and 610, of the image 606. As can be inferred from the above discussion, each constituent array camera can thereby image a respective portion of the scene with relatively greater sampling density (due to larger magnification—i.e., a smaller part of object is mapped onto same sensor area), since each constituent camera images only that respective portion of the scene, and not the entire scene (as is the case when a scene is imaged using a single array camera). In this way, the sampling density of the image data can be relatively increased. The image data captured by the constituent array cameras can then be utilized to perform depth estimation using any of the techniques described above in U.S. Pat. No. 8,619,082 and the image data can also be utilized to fuse image data from different color channels and/or synthesize higher resolution images using techniques similar to those described in U.S. Patent Publication No. 2012/0147205, the relevant disclosures from which are incorporated by reference separately above. One of the synthesized images can then be warped into the viewpoint of the second synthesized image using one or both of the depth maps of the synthesized images and calibrated warp infor-mation. Synthesized images warped into the same viewpoint can be combined using processes including (but not limited) interpolation.

FIG. 6B diagrams the capturing of image data for a scene of an AMC IMAX theater corresponding with the image seen in FIG. 5B. The first constituent array camera captures image data corresponding with the right half of the image, while the second constituent array camera captures image data corresponding with the left half of the image. The image is then constructed by synthesizing images with respect to each half of the scene, warping one of the images into the viewpoint of the other information using a depth based calibrated warp, and then combining the images using a process such as (but not limited to) Poisson blending. Because the sampling density is relatively greater, a higher quality image can be produced using techniques including (but not limited to) synthesizing images using each constituent array camera and performing image stitching. As can readily be appreciated, the processes described herein are not limited to stitching two images. Any number of images that can be warped into the same viewpoint can be mosaicked as appropriate to the requirements of specific applications.

Examples of configuration parameters that can be used to implement array camera configurations in accordance with embodiments of the invention is now discussed below.

Sample Camera Parameters

The optics of the above-described configurations can be implemented with any of a variety of parameters in accordance with embodiments of the invention. For example, in one embodiment, the optics of a constituent array camera that provides a relatively narrow combined field of view (i.e. a telephoto lens) include the following parameters: an f-stop of F/3.0; an effective focal length of 4.7 mm; a full diagonal field of view of 26°; TTL of 5.0 mm; an ENPD of 1.7 mm; and an image circle diameter of 2.2 mm. In several embodiments, achromatization is achieved by using a crown material as the positive (focusing) first element on the first substrate's front surface and a flint-equivalent as the second element on the first substrate's backside, which can be of negative power. In many embodiments, an image sensor that has a 400 μm AF32 with a 42 μm air gap. A field flattener may be directly replicated on the cover glass substrate. In some instances, the field flattener is implemented at the wafer scale. In many cases, a COB process could be applied where the full lens stack is integrated onto the image sensor without CG. In this way, the field flattener substrate can serve as a CG. In some embodiments, Forbes aspheres lens surface types are implemented. Although the above described technique can utilize wafer level optics, any suitable technique can be used to construct lenses—for example, injection molding techniques can be used Thus, in one embodiment, a telephoto lens implemented in a constituent array camera exploits injection molding techniques and includes the following parameters: an f-stop of F/2.8; an effective focal length of 4.68 mm; a full diagonal field of view of 26°; TTL of 5 mm; an ENPD of 1.7 mm; and an image circle diameter of 2.2 mm. In many embodiments, typical plastic injection molding material basis is used, for example ZEONEX E48R as the crown, polycarbonate as the flint. Of course, other material combinations can be used. In several embodiments, achromitization is achieved by using a crown material, such as ZEONEX E48R, as the positive (focusing) first element and a flint-equivalent of negative power. In many embodiments, a sensor package is used where the monolithic plastic field flattener also serves as the sensor CG, which can allow the field flattener to be comparatively thick. In some embodiments, an APTINA CSP is used as the image sensor, which has a 400 μm AF32 with a 42 μm air gap. In some cases, a COB process could be applied where the full lens stack is integrated onto the image sensor without CG. In some embodiments, Forbes aspheres lens surface types are implemented. Of course, although several parameters are discussed, it should be understood that constituent array cameras in accordance with various embodiments of the invention can be implemented in any number of different ways. For example, although the above-described technique regards the utilization of injection molding—lenses may also be constructed using wafer level optics in accordance with embodiments of the invention (as described previously). Note also that although the above-described parameters are directed to telephoto lenses, any type of optics may be implemented using the above-described techniques to implement constituent array cameras in accordance with embodiments of the invention. For example, wide angle lenses may be fabricated using the described techniques. Also, the optics for constituent array cameras having viewing directions that are suitable for image stitching may be fabricated.

In one embodiment, the optics of a constituent array camera that is meant to capture an image that can be stitched with other images includes the following parameters: an F-stop of F/3; an effective focal length of 2.1 mm; a full diagonal field of view of 54.3°; a TTL of 2.25 mm; an ENPD of 0.7 mm; and an image circle diameter of 2.2 mm. As before, typical plastic injection molding material basis can be used where the optics are fabricated using injection molding techniques, for example ZEONEX E48R as the crown, polycarbonate as the flint. Of course, other material combinations can be used. Also, achromitization can be achieved by using a crown material, such as ZEONEX E48R, as the positive (focusing) first element and a flint-equivalent of negative power. And again, a sensor package can be used where the monolithic plastic field flattener also serves as the sensor CG, which can allow the field flattener to be comparatively thick. For example, an APTINA CSP can be used as the image sensor, which has a 400 μm AF32 with a 42 μm air gap. In some cases, a COB process could be applied where the full lens stack is integrated onto the image sensor without CG. In some embodiments, Forbes aspheres lens surface types are implemented.

Of course, it should be understood that although particular techniques are described above, any suitable techniques can be used to implement the constituent array cameras in accordance with embodiments of the invention.

Moreover, although certain examples of array camera configurations have been discussed, the above configurations should not be construed as limiting. For instance, although FIGS. 4-6B corresponding to the above discussion illustrate array camera configurations having two constituent array cameras, it should be understood that array camera configurations can include more than two constituent array cameras in accordance with embodiments of the invention. Further, the fields of view and/or viewing directions provided by constituent array cameras can be distinct in any number of ways. For example, in some embodiments, the viewing directions provided by the constituent array cameras partially overlap, but also include areas of a scene not within the viewing direction of another constituent array camera. Moreover, image data obtained by the constituent array cameras can be processed in any number of ways in accordance with embodiments of the invention, and is not restricted to providing an image with a foveated region, or providing an image that spans the viewing direction of all constituent array cameras. In addition, array camera configurations in accordance with many embodiments of the invention can incorporate one or more conventional array cameras as appropriate to the requirements of specific applications. The processing of image data captured by array camera configurations in accordance with various embodiments of the invention in alternate ways is now discussed below.

Auto Calibration

Similar to the stereo array cameras disclosed in U.S. Patent Application No. 61/798,673, entitled "Systems and Methods for Stereo Imaging with Camera Arrays" to Venkataraman et al., incorporated by reference above, array camera configurations having constituent array cameras that each have a distinct combined field of view and/or viewing direction can process image data to determine the distance between constituent array cameras in accordance with embodiments of the invention. In particular, pixels in a first constituent array camera corresponding with objects in a scene that have corresponding pixels in a second constituent array camera can be cross-correlated to determine the distance between the two constituent array cameras. In some embodiments, depth information is computed using image data provided by each constituent array camera; then, by cross-correlating either the pixels of two constituent array cameras or the depths calculated by the two array cameras, the baseline distance between the two array cameras can be determined.

Note that the depth information calculated by a single constituent array camera often may have some degree of error due to noise, nonlinearities or manufacturing defects in the lenses of the cameras, and/or other factors. The error can manifest in statistical variations in the depths calculated by the constituent array camera. By correlating the depths calculated by one constituent array camera in an array camera configuration with the depths calculated by the second constituent array camera and/or depths calculated using images constructed using the image data from one constituent array camera together with images constructed from a second constituent array camera, an estimate can be made of the most likely baseline distance between the two constituent array cameras. Using the calculated baseline distance, the array camera configuration can calculate (or recalculate) depth information to a higher precision for any object that is visible to multiple constituent array cameras in the configuration, such as by the processes outlined in U.S. Patent Application No. 61/798,673.

Using image data provided by the array camera to the processor, array camera configurations can further enhance parallax computations, and this is discussed below.

Unified Parallax Computation

Similar to the configurations disclosed in U.S. Patent Application No. 61/798,673, incorporated by reference above, in many embodiments of the invention, an array camera configuration having at least one constituent array camera that has a combined field of view and/or viewing direction that overlaps with that of at least one other constituent array camera (or conventional camera) can facilitate parallax disparity calculations. In some embodiments, parallax computations are first performed in a first constituent array camera, thereby determining depth of certain objects within a scene. Accordingly, with the depths of certain objects of the scene within the combined field of view of a second constituent array camera, the depth information can be used to accelerate the parallax computations for the second constituent array camera. Parallax calculations can be performed using processes such as those disclosed in U.S.

patent application Ser. No. 13/972,881 incorporated by reference above. As also elaborated in U.S. Patent Application No. 61/798,673, when pixels and/or objects have a depth that was already calculated by a first constituent array camera, the search for similar pixels in image data captured by the second constituent array camera can use the depth information for the same pixel/object as a starting point and/or to limit the search to the "expected" portions of the image as predicted by the existing depth information. In several embodiments, the pixel/object can be correspondingly identified in images captured by the second constituent array camera such that the existing depths can be applied to the proper pixel/object, even when the corresponding pixel/object is not in the same location within the image(s).

High Resolution Image Synthesis

The image data in low resolution images corresponding with image data captured by a constituent array camera can be used to synthesize a high resolution image using super-resolution processes such as those described in U.S. patent application Ser. No. 12/967,807 entitled "Systems and Methods for Synthesizing High Resolution Images Using Super-Resolution Processes" to Lelescu et al., incorporated by reference above, in accordance with embodiments of the invention. A super-resolution (SR) process can be utilized to synthesize a higher resolution (HR) 2D image or a stereo pair of higher resolution 2D images from the lower resolution (LR) images captured by an array camera. The terms high or higher resolution (HR) and low or lower resolution (LR) are used here in a relative sense and not to indicate the specific resolutions of the images captured by the array camera.

Similarly to the disclosure of U.S. Patent Application 61/798,673, incorporated by reference above, an array camera configuration that includes multiple constituent array cameras, with each array camera having a field of view that is distinct from another constituent array camera, may be used to further enhance the super-resolving process in accordance with embodiments of the invention. While the relatively large baseline distance between two constituent array cameras could result in relatively larger occlusion zones (where parallax effects block some content that is captured in one camera from being captured in another camera), in other visible areas the cameras from the two arrays would enhance the final achieved solution. Preferably, each array camera is complete in its spectral sampling and utilizes a it color filter pattern so that the image that is synthesized using a constituent array camera is devoid of parallax artifacts in occlusion zones. In other embodiments, a separate super-resolution process is performed with respect to the image data captured by each constituent array camera and then calibrated warps based upon depth information utilized to shift all of the high resolution images into a common viewpoint. The combined images can then be interpolated to form a high resolution image using the image data captured by all of the constituent array cameras and/or conventional cameras.

High-Resolution Depth Map

Similarly to the disclosure of U.S. Patent Application 61/798,673, incorporated by reference above, an array camera configuration that includes multiple constituent array cameras, where at least one constituent array camera has a combined field of view different from that of at least one other constituent array camera, can be used to generate a high resolution depth map whose accuracy is determined by the baseline separation distance between the two constituent array cameras. Depth maps can be generated by any of a variety of processes including those disclosed in U.S. patent application Ser. No. 13/972,881 incorporated by reference above. As explained in U.S. Patent Application Ser. No. 61/798,673, the accuracy of depth measurement by an array camera is reduced at further distances from the camera. However, by using image data from two constituent array cameras separated by a baseline distance, the accuracy of depth measurements can be improved in relation to the baseline separation distance.

Near-Field and Far-Field Stereo

Similarly to the disclosure of U.S. Patent Application 61/798,673, incorporated by reference above, in many embodiments, an array camera configuration having a plurality of constituent array cameras can generate depth information about a scene, irrespective of whether objects in the scene are within the combined field of view of at least two constituent array cameras. For example, depth information for objects that are only within the field of view of a single constituent array camera can still be computed as image data from the corresponding constituent array camera can be used to construct images of the object from different perspectives.

Image data may also be used to generate images having virtual viewpoints in accordance with embodiments of the invention. Processes for generating virtual viewpoints for stereo vision in accordance with embodiments of the invention are disclosed in U.S. Provisional patent application Ser. No. 13/972,881 entitled "Systems and Methods for Parallax Detection and Correction in Images Captured Using Array Cameras that Contain Occlusions using Subsets of Images to Perform Depth Estimation" to Venkataraman et al., filed Aug. 21, 2013, the disclosure of which is hereby incorporated by reference in its entirety (above). In essence, virtual views that incorporate information from multiple cameras, and by extension multiple constituent array cameras, can be synthesized anywhere along epipolar lines connecting the centers of any two cameras (or constituent array cameras). For instance, where an array camera configuration includes a first constituent array camera having a field of view that is narrower and within that of a second constituent array camera, a virtual viewpoint can be synthesized that aggregates image data from the first and second constituent array camera; note that in many such instances, the field of view reflected the virtual viewpoint will have dimensions akin to those of first constituent array camera (i.e. the constituent array camera having the narrower field of view).

Although certain methods for processing image data has been described, it should be understood that image data obtained from constituent array cameras can be processed in any number of ways in accordance with embodiments of the invention. For example, the image data can be used to construct stereoscopic images of a scene. Furthermore, constituent array cameras can be implemented using subsets of cameras within an array. In addition, a conventional camera can be surrounded by cameras forming a constituent array having different fields of view and/or viewing directions as appropriate to the requirements of specific applications. Therefore, the layout of cameras in an array camera configuration should not be restricted to separate and distinct grids of cameras and/or separate and distinct conventional cameras. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An array camera configuration, comprising:
    a constituent array camera comprising a plurality of cameras, where each camera comprises: optics that form an image on a focal plane defined by an array of pixels that capture image data; and have fields of view that form a combined field of view in a first viewing direction;
    a separate camera comprising: optics that form an image on a focal plane defined by an array of pixels that capture image data; and having a field of view in a second viewing direction;
    a processor;
    memory containing an image processing application and calibrated warp data;
    wherein the image processing application directs the processor to:
        obtain image data from the cameras in the constituent array camera;
        capture an image using the separate camera from a viewpoint;
        generate a depth map using the image data captured by the constituent array camera;
        synthesize an image using the image data captured by the constituent array camera and the depth map; and
        construct an enhanced image using the image captured by the separate camera, the synthesized image, and the depth map used to synthesize the synthesized image by:
            warping the synthesized image into the viewpoint of the image captured by the separate camera using the calibrated warp data and the depth map; and
            blending the synthesized image warped into the viewpoint of the image captured by the separate camera and the image captured by the separate camera to create the enhanced image.

2. The array camera configuration of claim 1, wherein the cameras in the constituent array camera have fields of view that are narrower than and within the field of view of the separate camera.

3. The array camera configuration of claim 2, wherein the cameras in the constituent array camera capture image data at a higher angular resolution than the image data captured by the separate camera.

4. The array camera configuration of claim 2, wherein the cameras in the constituent array camera have optics with larger magnification than the optics of the cameras in the separate camera.

5. The array camera configuration of claim 4, wherein:
    the plurality of cameras in the constituent array camera include telephoto lenses;
    the separate camera includes a wide angle lens; and
    the telephoto lenses have higher angular resolution and contrast and longer focal lengths than the wide angle lens.

6. The array camera configuration of claim 2, wherein the optics of the cameras in the constituent array camera include at least one adaptive optical element enabling the independent adjustment of the focal length of the camera.

7. The array camera configuration of claim 2, wherein the optics of the cameras in the constituent array camera include at least one adaptive optical element that enables the lateral shifting of the centration of the refractive power distribution of the at least one adaptive optical element.

8. The array camera configuration of claim 2, wherein the enhanced image has a field of view of the image captured by the separate camera and includes a foveated high resolution region with an angular resolution of the image synthesized from the image data captured by the constituent array camera.

9. The array camera configuration of claim 1, wherein the field of view of the separate camera is narrower than and within the fields of view of the plurality of cameras in the constituent array camera.

10. The array camera configuration of claim 9, wherein the separate camera captures image data at a higher angular resolution than the image data captured by the cameras in the constituent array camera.

11. The array camera configuration of claim 9, wherein the separate camera has optics with larger magnification than the optics of the cameras in the constituent array camera.

12. The array camera configuration of claim 11, wherein:
    the separate camera includes a telephoto lens;
    the cameras in the constituent array camera include wide angle lenses; and
    the telephoto lens has higher angular resolution and contrast and longer focal lengths than the wide angle lenses.

13. The array camera configuration of claim 9, wherein the enhanced image has a field of view of the image synthesized using the image data captured by the plurality of cameras in the constituent array camera and includes a foveated high resolution region with an angular resolution of the image captured by the separate camera.

14. The array camera configuration of claim 1, wherein the image processing application directs the processor to synthesize an image using the image data captured by the cameras in the constituent array camera and a depth map by performing a super-resolution process to synthesize a high resolution image using image data captured by the cameras in the constituent array camera and the depth map generated using the image data.

15. The array camera configuration of claim 1, wherein the combined field of view of the cameras in the constituent array camera and the first viewing direction are oriented relative to the field of view of the separate camera and the second viewing direction so that the combined field of view partially overlaps with the second field of view beyond a specific object distance.

16. The array camera configuration of claim 1, wherein cameras in the constituent array camera have different imaging characteristics.

17. The array camera configuration of claim 1, wherein the constituent array camera includes a M×N array of cameras.

18. The array camera configuration of claim 1, wherein the constituent array camera comprises an array camera module including an array of lens stacks forming separate apertures and an imager array including an array of focal planes, where each lens stack forms an image on a corresponding focal plane.

19. The array camera configuration of claim 1, wherein different cameras in the constituent array camera capture images of different portions of the light spectrum.

20. The array camera configuration of claim 19, wherein the lens stacks of the different cameras differ based upon the portion of the spectrum imaged by the camera.

21. The array camera configuration of claim 20, wherein at least one lens element in the lens stacks of the different cameras have a surface with different shapes.

22. The array camera configuration of claim 20, wherein at least one lens element in the lens stacks of the different cameras are constructed from different materials.

23. The array camera configuration of claim 19, wherein different types of cameras in a constituent array camera are located on either side of a reference camera.

* * * * *